United States Patent
Löppönen et al.

(10) Patent No.: US 7,408,948 B2
(45) Date of Patent: *Aug. 5, 2008

(54) PACKET MODE SPEECH COMMUNICATION

(75) Inventors: Jussi Löppönen, Helsinki (FI); Jarno Rajahalme, Kirkkonimmi (FI); Hannu Töyrylä, Espoo (FI); Markku Vimpari, Oulu (FI); Richard Bontempi, Helsinki (FI)

(73) Assignee: Nokia Corporation, Espoo (FI)

( * ) Notice: Subject to any disclaimer, the term of this patent is extended or adjusted under 35 U.S.C. 154(b) by 852 days.

This patent is subject to a terminal disclaimer.

(21) Appl. No.: 10/474,944

(22) PCT Filed: Apr. 12, 2002

(86) PCT No.: PCT/FI02/00313

§ 371 (c)(1),
(2), (4) Date: Oct. 16, 2003

(87) PCT Pub. No.: WO01/67674

PCT Pub. Date: Sep. 13, 2001

(65) Prior Publication Data

US 2004/0120474 A1    Jun. 24, 2004

Related U.S. Application Data

(63) Continuation-in-part of application No. 09/835,867, filed on Apr. 17, 2001.

(51) Int. Cl.
*H04J 3/17* (2006.01)
(52) U.S. Cl. ........................ 370/433; 370/432; 370/310; 370/411

(58) Field of Classification Search ................. 370/229, 370/230, 310, 389, 310.1, 316, 328, 329, 370/340, 341, 395.1, 431–433, 464–465, 370/468, 480, 492–493, 498, 501; 455/411, 455/426, 428, 430
See application file for complete search history.

(56) References Cited

U.S. PATENT DOCUMENTS 5,650,995 A * 7/1997 Kent ........................ 455/508

(Continued)

FOREIGN PATENT DOCUMENTS

EP        1182895        2/2002

(Continued)

OTHER PUBLICATIONS

Delphine Plasse, "Call Control Scenarios in the "all-IP" UMTS Core Network", The 11th International Symposium on Personal, Indoor and Mobile Radio Communications, PIMRC 2000, pp. 322-326, vol. 1, Sep. 18-21, 2000.

(Continued)

*Primary Examiner*—Wing Chan
*Assistant Examiner*—Mark A. Mais
(74) *Attorney, Agent, or Firm*—Squire, Sanders & Dempsey LLP

(57) ABSTRACT

A packet mode (e.g. IP) group communication service layer is provided on top of a standard mainstream cellular radio network. Conceptually, the group communication layer includes a pair of basic logical entities, an application bridge and a call processing server (CPS). The bridge and the CPS run group service applications which communicate with group service application(s) in a mobile station MS over the IP connections provided by the radio network. The CPS is responsible for control plane management of group communications. The bridge is responsible for the real-time distribution of VoIP packets to the user terminals according to their group memberships over valid connections programmed by the CPS.

68 Claims, 6 Drawing Sheets

U.S. PATENT DOCUMENTS

| | | | |
|---|---|---|---|
| 5,717,830 A * | 2/1998 | Sigler et al. | 455/426.1 |
| 6,240,069 B1 | 5/2001 | Alperovich et al. | |
| 6,757,365 B1 * | 6/2004 | Bogard | 379/88.17 |
| 6,930,994 B1 * | 8/2005 | Stubbs | 370/348 |
| 6,970,926 B1 * | 11/2005 | Needham et al. | 709/225 |
| 7,020,130 B2 * | 3/2006 | Krause et al. | 370/352 |
| 7,203,490 B2 * | 4/2007 | Karabinis et al. | 455/428 |

FOREIGN PATENT DOCUMENTS

| | | |
|---|---|---|
| WO | WO 97/28658 | 8/1997 |
| WO | 98/25423 | 6/1998 |
| WO | WO 99/63773 | 12/1999 |
| WO | 00/40045 | 7/2000 |
| WO | 00/57656 | 9/2000 |
| WO | 01/67674 | 9/2001 |
| WO | 01/67787 | 9/2001 |
| WO | 02/32165 | 4/2002 |

OTHER PUBLICATIONS

ETS1 TS 101.315 V1.1 (2002-2003), Telecommunications and Internet Protocol Harmonization Over Networks (TIPHON) Release 3; Functional entities, information flow and reference point definitions; Guidelines for application of TIPOHN functional architecture to inter-domain services, chapters 6 and 7.

Japanese Office Action for patent application No. 2002-582646, Jan. 22, 2007.

* cited by examiner

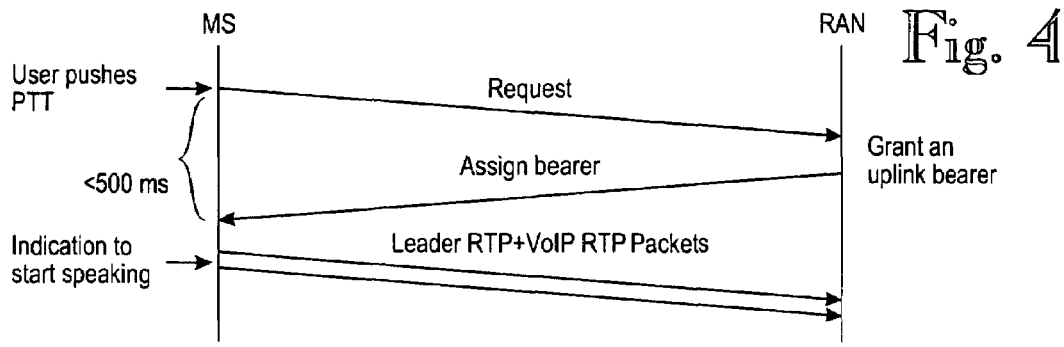
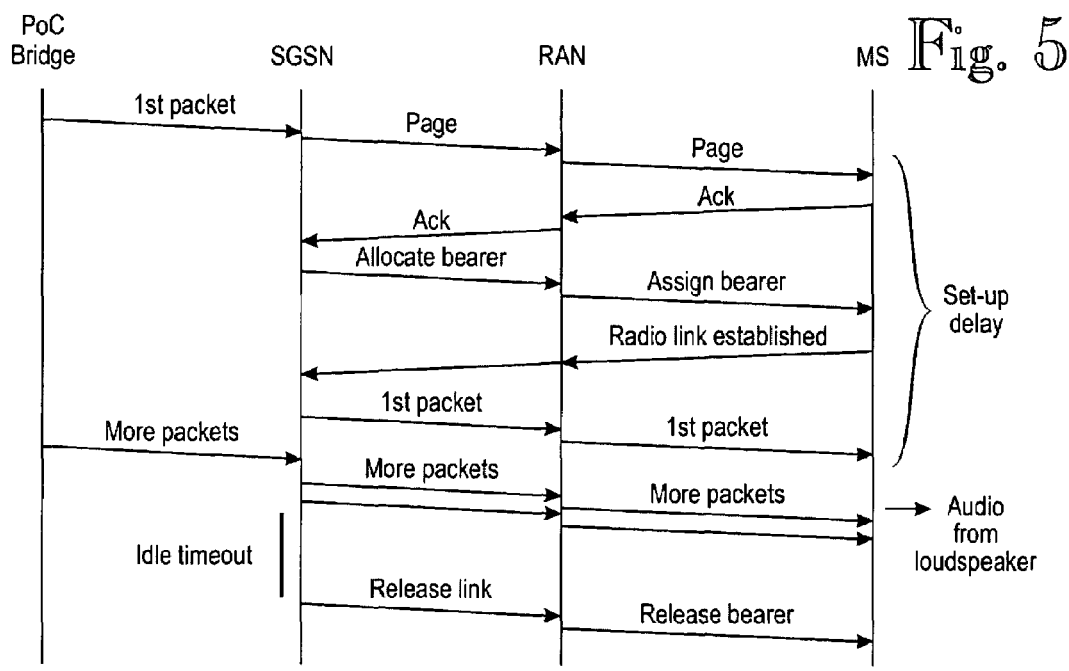
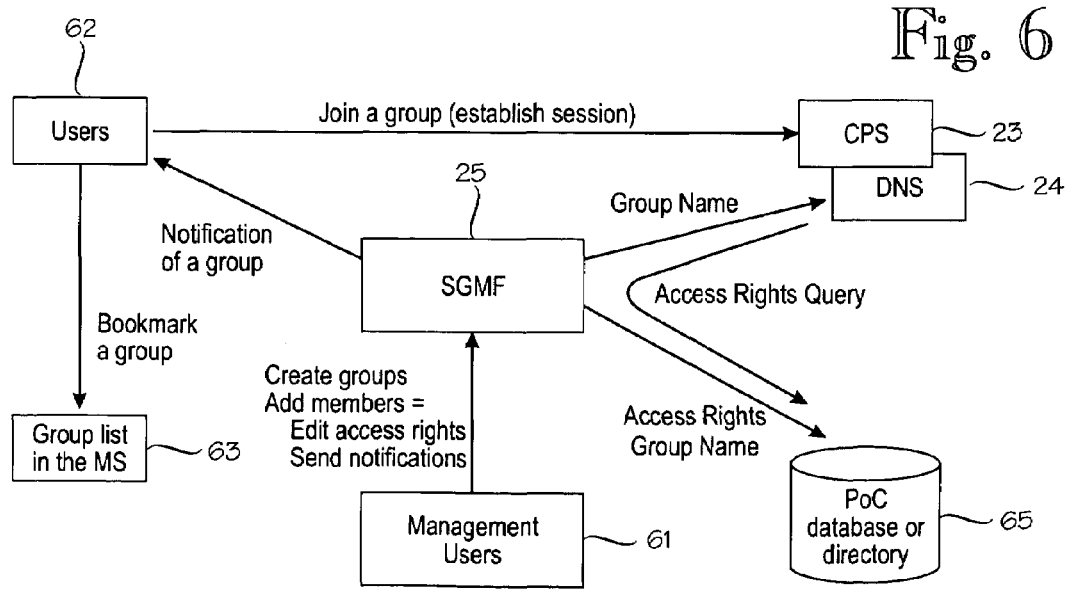

PACKET MODE SPEECH COMMUNICATION

CROSS REFERENCE TO RELATED APPLICATIONS

This application is a 371 application of PCT International Application No. PCT/FI02/00313, filed on 12 Apr. 2002, which is a Continuation-in-Part (CIP) of U.S. patent application Ser. No. 09/835,867, Packet Mode Speech Communication, filed on 17 Apr. 2001. The subject matter of these previously filed applications is hereby incorporated by reference.

FIELD OF THE INVENTION

The invention relates to communications systems, and especially to packet mode speech communication in communication systems. This application is a 371 of PCT/FI02/00313 dated 12 Apr. 2002, which is a Continuation-In-Part (CIP) of Ser. No. 09/835,867, Packet Mode Speech Communication, dated 17 Apr. 2001.

BACKGROUND OF THE INVENTION

A mobile communications system refers generally to any telecommunications system which enables wireless communication when users are moving within the service area of the system. A typical mobile communications system is a Public Land Mobile Network (PLMN). Often the mobile communications network is an access network providing a user with wireless access to external networks, hosts, or services offered by specific service providers.

Professional Mobile Radio or Private Mobile Radio (PMR) systems are dedicated radio systems developed primarily for professional and governmental users, such as the police, military forces, oil plants, etc. PMR services have been offered via dedicated PMR networks built with dedicated PMR technologies. This market is divided between several technologies—analog, digital, conventional and trunked—none of which has a dominating role. TETRA (Terrestrial Trunked Radio) is a standard defined by ETSI (European Telecommunications Standards Institute) for digital PMR systems. U.S. Pat. No. 6,141,347 discloses a wireless communications system which uses multicast addressing and decentralized processing in group calls.

One special feature offered by the PMR systems is group communication. The term "group", as used herein, refers to any logical group of three or more users intended to participate in the same group communication, e.g. call. The groups are created logically, i.e. special group communication information maintained on the network side associates specific user with a particular group communication group. This association can be readily created, modified or canceled. The same user may be a member in more than one group communication group. Typically, the members of the group communication group belong to the same organization, such as the police, the fire brigade, a private company, etc. Also, typically, the same organization has several separate groups, i.e. a set of groups.

A group call typically has a long duration (up to days) during which communication takes place quite infrequently and each interaction is typically short. The total active traffic may be, for example, only 15 minutes during a call. Each talk burst or speech item has an average length of 7 seconds in the existing PMR systems. Therefore, the radio channels or other expensive system resources cannot be allocated all the time, because the service becomes much too expensive. Group communication with a push-to-talk feature is one of the essential features of any PMR network overcoming this problem. Generally, in group voice communication with a "push-to-talk, release-to-listen" feature, a group call is based on the use of a pressel (PTT, Push-To-Talk switch) in a telephone as a switch: by pressing a PTT the user indicates his desire to speak, and the user equipment sends a service request to the network. The network either rejects the request or allocates the requested resources on the basis of predetermined criteria, such as the availability of resources, priority of the requesting user, etc. At the same time, a connection is established also to all other active users in the specific subscriber group. After the voice connection has been established, the requesting user can talk and the other users listen on the channel. When the user releases the PTT, the user equipment signals a release message to the network, and the resources are released. Thus, the resources are reserved only for the actual speech transaction or speech item.

There are typically various requirements for group communications in communications systems.

Call set up times must be relatively short, i.e. set up times in the order of several seconds cannot be allowed. When a user initiates a call, or rather, a speech item, he/she should be able to start speaking at the initiation of the set up within few hundreds of milliseconds. The listening parties should hear the talk possibly within approximately a second. This voice delay can be longer because a semi-duplex mechanism is used. These values are only examples.

Group communication requires traffic discipline: one talks and the others listen. Therefore the radio interface is of a semi-duplex type. Only one direction is active at a time. The communications system must be able to control that only one member speaks at a time in a group.

A user can belong to many groups at a same time. Therefore, a communications system must be able to select and prioritize the group the user listens to if there are multiple group communications to the user at the same time.

Not only to traditional PMR users, push-to-talk type of group calls are also attractive to several other types of users, too. For example, private persons might want to have talk groups, such as hobby groups, sport groups, etc. Small business users might also use the push-to-talk type of group communication feature for a more frequent job related communication during a working day within the same work group, either inside the company or within some business community.

SUMMARY OF THE INVENTION

An object of the invention is to provide a new way to provide and manage a packet mode speech communication service.

This object of the present invention is achieved by methods, systems, network units and subscriber equipment as disclosed in the attached independent claims. Various embodiments of the invention are disclosed in the dependent claims.

According to one aspect of the invention, a mainstream cellular radio network functions as a radio access network on top of which a packet mode (e.g. IP based) group communication service is provided. Practically all new elements and functionalities required by the invention are outside the radio access and mobile core networks. The radio access and mobile core network can be used as such without any need for costly changes in the mainstream network elements. In other words, the group communication service can be run through standard main stream radio access networks (such as Global System for Mobile Communications, GSM and Universal Mobile Telecommunications System, UMTS) such that the investment per end user in the infrastructure is low enough and thereby attractive to the operators. In an embodiment of the invention the group communication service is implemented as a Voice over IP (VoIP) data application on top of the Internet Protocol (IP) data service of the mobile radio network. Any user which is active in an IP-based group communication service, e.g. active in a group call, has a pre-established logical connection through the radio access network to the group communication service entities. For example, logical connections similar to the Packet Data Protocol (PDP) contexts used in the GPRS service (General Packet Radio Service) may be used. The actual communication path, including the channel resources at the air interface in the sending and receiving ends, needs to be opened and the resources to be reserved only for the duration of the talk item. Call set-up signaling, authentication, agreement of encryption keys and negotiation of service parameters are not needed in the resource reservation phase, because the logical connections already exist, but the physical resources are reserved and opened by using the signaling procedures. Thus, short connection set up times can be achieved.

In an embodiment of the invention all signaling relating to controlling a speech item is carried out as a user plane signaling embedded in a user traffic. In an embodiment of the invention, a user traffic is in form of real time transport (RTP) packets. In an embodiment of the invention the embedded speech item signaling comprises a leader packet sent in a beginning of a user traffic stream containing user voice data packets, such as RTP packets, and a group communication service entity grants or rejects the speech item based on the leader packet. In an embodiment of the invention, a group communication service, upon granting a group communication service a speech item based on the leader packet, opens a speech item communication to receiving members of a group by forwarding a user traffic stream containing said leader packet and subsequent voice packets to the receiving members. In an embodiment of the invention, the embedded speech item signaling comprises a trailer packet sent at end of a user traffic stream containing user voice data packets, such as RTP packets, and a group communication service entity ends the speech item based on the trailer packet. In an embodiment of the invention, a group communication service entity forwards a trailer packet at end of a user traffic stream to receiving group members in order end the speech item communication to the receiving group members. Another aspect of the invention is a method for packet mode group voice communication in a communications system, comprising the steps providing a group communication service entity on top of the said communications system, providing said group communication service entity with individual addresses of group members in at least one group communication group, sending voice packets from one of said group members to said group communication service entity, each voice packet being addressed to said at least one group, forwarding said voice packets individually to each receiving one of said group members on the basis of said individual addresses.

Another aspect of the invention is a method for packet mode group voice communication in a communications system, comprising the steps of providing group communication service entity with individual addresses of group members of a group communication group, creating an individual logical connection from each group member to said group communication service entity by means of outband signaling, starting a speech item in said group by sending a leader packet embedded in a user traffic stream from one of said group members to said group communication service entity over said individual logical connection, each leader packet containing the identifier of the respective group member, said group communication service entity either i) rejecting said started speech item, or ii) granting the started speech item to said one group member and forwarding said leader packet and subsequent voice packets in said user traffic stream individually to each receiving one of said group members in said group on the basis of said individual addresses.

Another aspect of the invention is a method of managing traffic streams in a communications system having a packet mode group voice communication feature, comprising the steps of providing a user-specific communications function for managing traffic streams addressed to a user who is active in at least one group communication group or in a one-to-one communication, receiving a first voice packet stream related to a first group communication group or a first one-to-one communication and addressed to a user who is active at least in said first group communication group or in said first one-to-one communication, forwarding said first voice packet stream to said respective user, monitoring continuity of said first voice packet stream, receiving at least one further voice packet stream related to at least one further group or one-to-one communication, forwarding no one of said at least one further voice packet streams to said user if said first voice packet data stream is continuous, forwarding one of said at least one further voice packet streams to said user if said first voice traffic stream has been discontinued for a predetermined period of time.

Another aspect of the invention is a server system for providing a packet mode group communication service for a communications system, said server system comprising a group server provided on top of said communications system, said group server further comprising means for storing individual addresses of group members in at least one group communication group, means for receiving voice packets from said group members, each received voice packet containing information identifying the communication group which the respective packet is addressed to, means for granting a speech item to one group member per a communication group in turn, means for unicasting each voice packet received from said group member having a speech item in a group communication group separately to each receiving member in said respective group communication group on the basis of said individual addresses.

Another aspect of the invention is a server system for providing a packet mode group communication service for a communications system, said server system comprising a group server provided on top of said communications system, said group server further comprising means for identifying and authenticating a source of group communication, means for controlling that only one group member in a group talks at a time, means for checking active group members in a group to which voice packets from a currently talking group member are destined to and means for generating from an incoming voice packet an outgoing packet to be forwarded separately to each of said active group members, and means for selecting from possible multiple incoming traffic streams destined to one group member the one which is to be forwarded to said one group member.

Another aspect of the invention is a server system for providing a packet mode group communication service for a communications system, said server system comprising at least one first group communication network entity providing group specific communications functions, said first group communication network entity further comprising a data memory storing individual addresses of group members in at least one group communication group, means for receiving voice packets from said group members, each received voice packet containing information identifying the communication group which the respective packet is addressed to, means for granting a speech item to one group member per communication group in turn, means for unicasting each voice packet received from said group member having a speech item in a group communication group separately to each receiving member in said respective group communication on the basis of said individual addresses, at least one second user communication network entity providing user-specific communications functions for at least one user, whereby any group related communication from a user managed by said second user network entity being routed first to said second user network entity and then forwarded to an appropriate first group network entity, and any unicast voice packet from said at least one first group network entiy being routed first to said second user network entity prior to sending the voice packet to the respective user.

Another aspect of the invention is a server system for providing a packet mode group communication service for a communications system, said server system comprising wherein at least one group communication network entity providing group specific communications functions, said group network entity further comprising means for controlling that only one group member in a group talks at a time, means for checking active group members in a group to which voice packets from a currently talking group member is destined to and for generating from an incoming voice packet an outgoing packet to be forwarded separately to user server having serving at least one active member in said group, a user communication network entity providing user-specific communications functions on a user plane for at least user, said user network entity further comprising means for identifying and authenticating a source of group communication, means for selecting from possible multiple incoming traffic streams destined to one group member the one which is to be forwarded to said one group member.

Another aspect of the invention is a server system for providing a packet mode group communication service for a communications system, said server system comprising at least one group communication network entity providing group specific communications functions in a user plane, said group network entity further comprising means for storing individual addresses of group members in at least one group communication group, means for receiving voice packets from said group members, each received voice packet containing information identifying the communication group which the respective packet is addressed to, means for granting a speech item to one group member per communication group in turn, means for unicasting each voice packet received from said group member having a speech item in a group communication group separately to each receiving member in said respective group communication on the basis of said individual addresses, a user communication network entity providing user-specific communications functions on a user plane for at least one user, whereby any group related communication from a user managed by said user network entity being routed first to said user network entity and then forwarded to an appropriate group network entity, and any unicast voice packet from said at least one group network entity being routed first to said user network entity prior to sending the voice packet to the respective user, a group call processing entity responsible for control plane management of the group communications in said group network entity, and a user call processing entity responsible for control plane management of the communications in said user network entity.

Another aspect of the invention is a network unit for managing speech items in a communications system having a packet mode group voice communication feature, comprising means for storing individual addresses of group members in at least one group communication group, means for receiving voice packets from said group members, each received voice packet containing information identifying the communication group which the respective packet is addressed to, means for granting a speech item to one group member per a communication group in turn, means for unicasting each voice packet received from said group member having a speech item in a group communication group separately to each receiving member in said respective group communication group on the basis of said individual addresses.

Another aspect of the invention is a network unit for managing traffic streams addressed to a user who is active in at least one group communication group or in one-to-one communication, comprising means for selecting for unicast to a user a first voice packet stream related to a first group or one-to-one communication addressed to said user, means for monitoring continuity of said selected first voice packet stream, means for discarding any other received voice packet stream related to at least one further group or one-to-one communication, if said currently selected voice packet stream is continuous, and means for selecting and unicasting another received voice packet stream to said user if said initially selected and unicasted first voice traffic stream has been discontinued for a predetermined period of time.

Another aspect of the invention is a method for establishing a one-to-one voice communication in a communications system, comprising the steps of providing a communication server on top of the said mobile communications system, creating an individual logical connection between said communication server and each user having an active communication service in said communication server, starting a communication by sending a leader packet embedded in a traffic stream from a user to said communication server over respective said individual logical connection, each leader packet containing identifier of said sending user and a receiving user, said communication server either i) rejects said started speech item, or ii) grants the started speech item to said sending user and forwards said leader packet and subsequent voice packets of said user traffic stream to said receiving user on the basis of said received identifier of said receiving user.

Another aspect of the invention is a subscriber equipment for communications system having a packet mode group voice communication service, said subscriber equipment comprising mechanisms for packet data communication over a communications system, a group communication application on top of said mechanisms, said application having first means for establishing a logical packet connection to a group communication server, said application having second means for sending and receiving voice packets to and from said group communications server.

Another aspect of the invention is a subscriber equipment for communications system having a packet mode group voice communication service, said subscriber equipment comprising a push-to-talk means, means, responsive to activation of said push-to-talk means by a user, for sending a leader packet followed by voice packets in a user traffic stream to said group communication service and thereby starting a speech item.

Another aspect of the invention is a method for providing a packet mode group communication service for a communications system, comprising storing individual addresses of group members in at least one group communication group, managing said group communication groups using a control plane signalling, group member requests speech item using user-plane signalling embedded in a user traffic stream, granting a speech item to one group member per a communication group in turn based on said embedded user plane signalling, receiving voice packets from a group member having a speech item in a group communication group, each received voice packet containing information identifying the communication group which the respective packet is addressed to, unicasting said embedded user-plane signalling and each voice packet received from a group member having a speech item separately to each receiving member in said respective group communication group on the basis of said individual addresses.

Another aspect of the invention is a server system for providing a packet mode group communication service for a communications system, comprising means for storing individual addresses of group members in at least one group communication group, means for managing said group communication groups using a control plane signalling, means for granting a speech item to one group member per a communication group in turn based on speech item requests speech sent by said group members using user-plane signalling embedded in a user traffic stream, means for receiving voice packets from a group member having a speech item in a group communication group, each received voice packet containing information identifying the communication group which the respective packet is addressed to, means for unicasting said embedded user-plane signalling and each voice packet received from a group member having a speech item separately to each receiving member in said respective group communication group on the basis of said individual addresses.

BRIEF DESCRIPTION OF THE DRAWINGS

In the following, the invention will be described in greater detail by means of preferred embodiments with reference to the accompanying drawings, in which

FIGS. 4 and 5 are signaling diagrams illustrating the allocation of uplink and downlink bearers, respectively, in the radio interface of a mobile network;

FIG. 6 shows an overview of a group management concept;

PREFERRED EMBODIMENTS OF THE INVENTION

The present invention is applicable to any digital communications systems which can be used as an access network allowing packet mode communication between end users and an overlaying packet mode group communication service. The invention is especially preferably used in mobile communications systems based on a GPRS-type packet radio. In the following, the preferred embodiments of the invention will be described by means of a GPRS service and the UMTS or GSM system without limiting the invention to this particular packet radio system. The IP voice communication method used in the preferred embodiments of the invention is the Voice over IP (VoIP), but the invention is not limited to this particular method.

Figure 1:
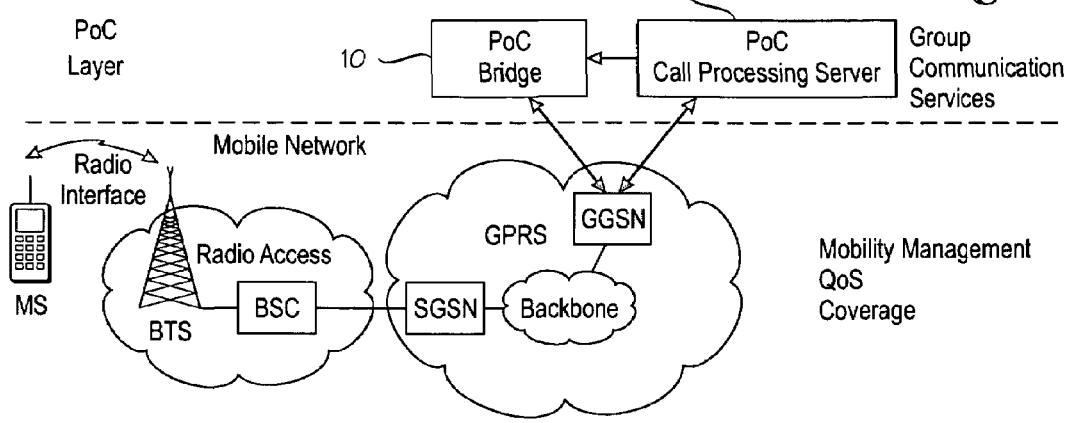
FIGS. 1, 2 and 3 illustrate the basic architecture of the invention.

FIG. 1 illustrates the basic architecture of the preferred embodiment of the invention. In the illustrated embodiment, a mobile Radio Access Network (RAN) which provides the IP packet data service is based on a GPRS architecture utilizing a 2G radio access technology, such as a GSM Base Station Subsystem BSS with Base Transceiver Stations BTS and Base Station Controllers BSC. The GSM radio access may be conventional or based on the GSM Enhanced Data rates for GSM Evolution (EDGE) technique. In the latter case, radio access may be referred to as GERAN which is an all-IP GSM radio access network. Alternatively, a 3G radio access network UTRAN (such as UMTS) may be used. An all-IP core network can be used both in GERAN and UTRAN. The architecture of the mobile network is not essential to the invention, but the GPRS infrastructure and operation will be briefly discussed in order to make it easier to comprehend the invention. The GPRS infrastructure comprises support nodes, such as a Gateway GPRS Support Node (GGSN) and a Serving GPRS Support Node (SGSN). The main functions of the SGSN are to detect new GPRS mobile stations in its service area, handle the process of registering new Mobile Stations MS (also called User Equipment, UE) along with the GPRS registers, send/receive data packets to/from the MS, and keep a record of the location of the MSs inside of its service area. The subscription information is stored in a GSM/GPRS register (HLR, Home Location Register or in 3G all-IP networks HSS, Home Subscriber Server). The main functions of the GGSN nodes involve interaction with external data networks. The GGSN may also be connected directly to a private corporate network or a host. The GGSN includes PDP addresses and routing information, i.e. SGSN addresses for active GPRS subscribers. The GGSN updates the location directory using routing information supplied by the SGSNs. The GGSN uses the routing information for tunneling the Protocol Data Units (PDUs) from external networks to the current location of the MS, i.e. to the serving SGSN, in accordance with the GPRS Tunneling Protocol (GTP). Tunneling means that the data packet is encapsulated into another data packet during transfer from one end of the tunnel to another. The GGSN also decapsulates data packets received from MSs and forwards them to the appropriate data network. In order to send and receive GPRS data, the MS activates the packet data address that it wants to use, by requesting a PDP activation procedure. This operation makes the MS known in the corresponding GGSN, and interworking with external data networks can commence. More particularly, one or more PDP contexts are created and stored in the MS and the GGSN and the SGSN. The PDP context defines different data transmission parameters, such as PDP type (e.g. X.25 or IP), PDP address (e.g. IP address) and Quality of Service (QoS).

In FIG. 1, a Push-to-talk Over Cellular (PoC) layer is provided on top of the mobile network in order to provide group communication services to the Mobile Stations (MS) through the mobile network. Conceptually, the PoC layer comprises a pair of basic logical entities, a PoC bridge 10 and a PoC Call Processing Server (CPS) 11. The bridge 10 and the CPS 11 are connected to the GGSN, typically over an IP network. The bridge 10 and the CPS server 11 run PMR applications which communicate with the PMR application(s) in the mobile station MS over the IP connections provided by the IP mobile RAN. This communication includes both signaling packets and voice (group and one-to-one) communication packets.

The CPS 11 is responsible for control-plane management of the PMR communications. Its important role may require various functionalities which in an embodiment of the invention are implemented in the following modules: "PMR server"—the application that handles the sessions for group memberships which are signaled with an appropriate session control protocol, such as Session Initiation Protocol (SIP), established for the PoC communications, and manages the users profiles (call rights, group active membership, scanning settings, etc.); SIP Proxy/Location Server—providing user location and routing functionalities of SIP signaling; SIP Registrar—for user registration/authentication; and Media Gateway Controller—controlling the network entities (PoC bridges) involved in the IP layer data distribution according to the group & user specific information (membership, rights, scanning settings, etc.). However, in this description, the common term CPS refers to all possible functionalities of the CPS.

Figure 2:
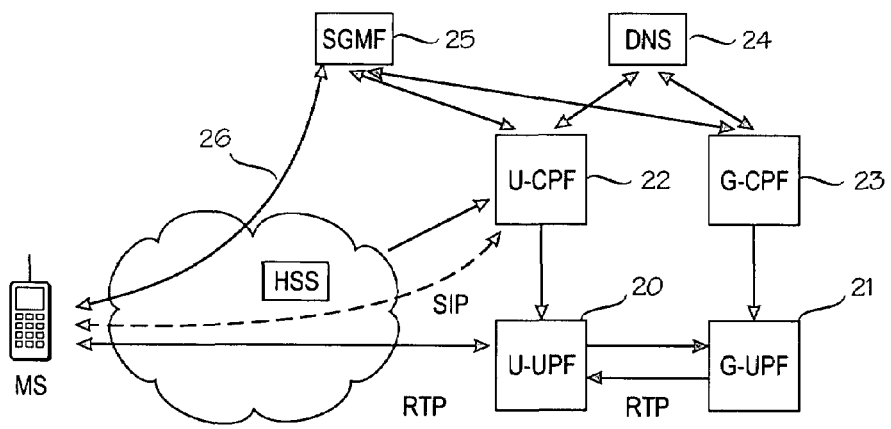

However, since the PMR management requirements can be divided into group and user specific ones, two kinds of CPS servers are defined in one embodiment of the invention, as illustrated in FIG. 2. The SIP sessions for group communications are handled by a Group Control Plane Function (G-CPF) (G-CPF) 23 (e.g. in a server). When a user attaches to a group, the G-CPF 23 takes care of the relative SIP invitation transaction and performs the proper mapping settings between the user's recipient and the network entities responsible for the relative traffic distribution. The User—Control Plane Function (U-CPF) 22 (e.g. a control plane proxy server) is basically the control plane interface between the IP network and the user. By this network entity the users log on to the system and negotiate their operational settings (scanning settings, selected group etc.). It handles the user's profile and manages his one-to-one calls. It should be appreciated that this is just a logical separation, and both kinds of CPS can be situated in the same computer. Separating G-CPF and U-CPF enables users to join PoC groups handled by G-CPF in different intranets or in mobile networks of different operators and IP domain. Division also brings scalability by allowing in practice infinite number of groups or users in the system.

Referring again to FIG. 1, the bridge 10 is responsible for the real-time distribution of VoIP packets to the users' terminals according to their group memberships, their scanning settings and eventual pre-emption or emergency cases. Each bridge forwards traffic only between valid connections programmed by the CPS. The bridge 10 may perform one or more of the following functionalities:

Input checking: to identify and authenticate the traffic source (optionally the mnemonics in the leader RTP packet, which will be discussed below, have to be processed here). Input checking may also include actions to perform and support security procedures.

Input filtering: to manage that only one talker talks in a group at a time (i.e. grants a speech item), and optionally to give priority to higher priority voice items.

Multiplication: after the filtering process, the bridge 10 has to check the active members of the group to which the traffic is destined and generate from the incoming packet a "downlink" packet for each active member.

Scanning filtering: to select from the multiple incoming traffic streams destined to the same user the one which has to be forwarded to his recipient according to the user's scanning settings.

Again, since input filtering and multiplication are group specific processes, while input checking and scanning filtering are user specific, the following two kinds of application bridges have been defined in one embodiment of the invention, as illustrated in FIG. 2.

Firstly, a Group—User Plane Function (G-UPF) G-UPF 21 (e.g. in a server) is a network entity to which group members' audio packets are sent (through their U-UPF) and where the input filtering and multiplication processes are performed. To each new group the G-CPF 23 assigns a single G-UPF 21 according to load balancing criteria which distributes the traffic as evenly as possible between the G-UPFs.

The User—User Plane Function (U-UPF) U-UPF20 (e.g. in a server) performs the input checking and scanning processes for the individual subscribers which have been assigned to it by the U-CPF 22. For security purposes the U-UPF 20 may have security associations for each mobile terminal it handles. The U-UPF 20 hides the network complexity from the mobile terminals, so the user has just to send all his user plane traffic to this unit that afterwards forwards it according to the mapping settings of the proper U-CPF 22. In this way there is no need to establish secure channels between each user and all the IP network entities which have just to trust the U-UPF 20 from which they receive packets.

As for the Control Plane elements, this logical splitting does not necessarily require a physical separation between the G-UPF and the U-UPF implementations, and thus they may be located in the same computer.

The U-CPF 22 and the G-CPF 23, which are responsible for managing the sessions of the users and the groups, respectively, require specific control plane signaling. ETSI 3GPP (European Telecommunications Standards Institute, 3rd Generation Partnership Project) specifications include IP based voice communications in a so called all-IP network. Such an all-IP network enables also voice communication in IP network (voice over IP, VoIP). For VoIP, call control signaling is specified, such as the Session Initiation Protocol (SIP), which is defined in the RFC2543. Therefore, in the preferred embodiment, the SIP has been chosen to support and manage the PoC call sessions. However, some other IP session protocol may be used instead. Further, in the preferred embodiment of the invention, Megaco (defined in RFC3015) is used by the G-CPFs 23 and the U-CPF 22 to control the G-UPFs 21 and U-UPFs 20 involved in traffic distribution of the IP layer. However, some other corresponding protocol for controlling the switching of the user plane elements may be used instead. Still further, RTP (Real-time Transport Protocol, defined in RFC1889) has been chosen to handle the transfer, and QoS mechanisms are needed to handle the voice packet (VoIP) delivery.

Megaco defines a general framework for physically decomposed multimedia gateway. Its connection model is based on two main abstractions which are Termination and Context. The former is a logical entity in the MGW (i.e. PoC Bridge) that sources and/or sinks one or more streams, while the latter is an association between a collection of Terminations that describes the topology (who hears/sees whom) and the media mixing and/or switching parameters if more than two Terminations are involved in the same association. Priority values can be used by the MGC (i.e. PoC CPS) in order to provide the MGW with information about a certain precedence handling for a context, and an indicator for an emergency call is also provided to allow a preference handling. The protocol provides commands for manipulating the logical entities of its connection model, contexts and terminations, and it is here assumed that it provides the flexibility and the functionalities required by the PMR CPS 11 (the G-CPF 23 and the U-CPF 22) to program the proper traffic paths and filtering/scanning processes in the PoC Bridge 10 (the G-UPF 21 and the U-UPF 20).

The SIP protocol defines signaling messages for call control, user location and registration, and these have been used in the preferred embodiment of the PoC solution to handle the specific PMR communications and the relative participating users (establishment, joining and tear down of a call session, user's log on to PoC services, user's profile negotiation, etc).

For each PoC communication, a SIP session is established and managed by the CPS handling it (G-CPF 23 and U-CPF 22 for group and one-to-one communications respectively). When a user wants to become an active member of a group, he has to join the corresponding session. For one-to-one calls, the PoC U-CPFs maintain one session between participating U-CPFs for each one-to-one call.

All the user's outgoing and incoming traffic has to go through the U-UPF 20 that has been assigned to the user. In particular, in the uplink the user's traffic is checked by his U-UPF 20 and forwarded to the G-UPF 21 handling the group to which the traffic is destined or, in case of one-to-one communication, to the U-UPF 20 handling the called party.

In the downlink, the traffic is then distributed to the destination users' U-UPFs 20 (by packet multiplication in the G-UPF 21 in case of group communication, packets are multiplied and forwarded to each U-UPF which is serving active members in the group). In the U-UPF, the users' scanning processes are performed and traffic is multiplied and forwarded to each user that listens to the group according to his current scanning settings.

This PoC solution is access independent, which means that it can run on top of GSM, WCDMA, WLAN or equivalent technologies as long as these are able to support the always-on VoIP bearers. The IP layer's audio distribution uses standard VoIP mechanisms (such as the RTP), while specific Internet protocols or interfaces will be used to connect supplementary network entities, such as Subscriber and Group Management Function (SGMF) 25, a Domain Name Server (DNS) 24, WWW/WAP (World Wide Web/Wireless Application Protocol) and security management servers. Each network entity is obviously associated with at least one IP address by which the IP packets are transferred and routed, but the role of the network elements have also to be defined from the SIP's point of view. Each MS is a SIP User Agent (UA), and thus each one has a SIP address (URL) which normally is "username@hostname" where the hostname can be, but not necessarily is associated with the U-CPF 22 in which the MSs have to register. This U-CPF 22 should act as a Registrar, Location and Proxy SIP server in order to allow the reachability of the MSs under his control and to support the SIP signaling routing. The G-UPFs 21 and U-UPFs 20, which are exclusively involved in the audio data distribution, do not have a role in the actual SIP mechanisms and the core network is simply seen as a single IP network link. At the SIP signaling level, URLs are used for user and group identification. The URLs can be sip: URLs as defined in the RFC2543, tel: URLs representing telephone numbers as defined in the RFC2806, or any other URL formats. The REGISTER method is used with a sip: URL, that is, SIP URL is the user main identity in PoC system. Dialing of users with a private numbering plan number (only) is possible using the tel: URL in the To: header field (sip: URL must have the host portion present at all times). A secondary identity can be used for example for addressing the b-party for one-to-one calls if the b-party is from the same Virtual Private Network (VPN). Groups are always addressed with sip: URLs, where the group name is used in place of the user name, and the host managing the group (exact G-CPF, if known) in the host portion. The addressing on the user plane will be explained in more detail below.

Additionally, an SGMF 25 is preferably provided in PoC system for management and information query/updating purposes. Via SGMF 25, operator or a normal user having management rights can create, delete and modify users and groups in PoC system. Also access rights related to users and groups can be created and modified. The information itself can be contained in a database, such as Structured Query Language (SQL) database or in a directory, such as Lightweight Directory Access Protocol (LDAP, defined in RFC2251) directory. These data repositories can be stand-alone or co-located with SGMF 25. This database or directory is the main data repository in PoC system. Normal users having management rights can access SGMF using a WWW/WAP interface. An important function of SGMF 25 is also processing requests coming from U-CPF 22 and G-CPF 23 and making database or directory fetches and updates according to the requests.

SOAP (Simple Object Access Protocol, defined by the World Wide Web Consortium W3C), or a similar protocol can be used in the interface between U-CPF 22 and SGMF 25 as well as in the interface between G-CPF 23 and SGMF 25.

The user equipment, or Mobile Station MS, has a PoC application on a user layer on top of the standard protocol stack used in the specific mobile communications system. The SIP and RTP protocols employ the underlying Transmission Control Protocol (TCP), User Datagram Protocol (UDP) and IP protocols which further employ the physical layer resources, such as the radio resources. Additionally, a WAP stack may be employed to access the WAP pages on SGMF 25 or on some another server.

Figure 3:
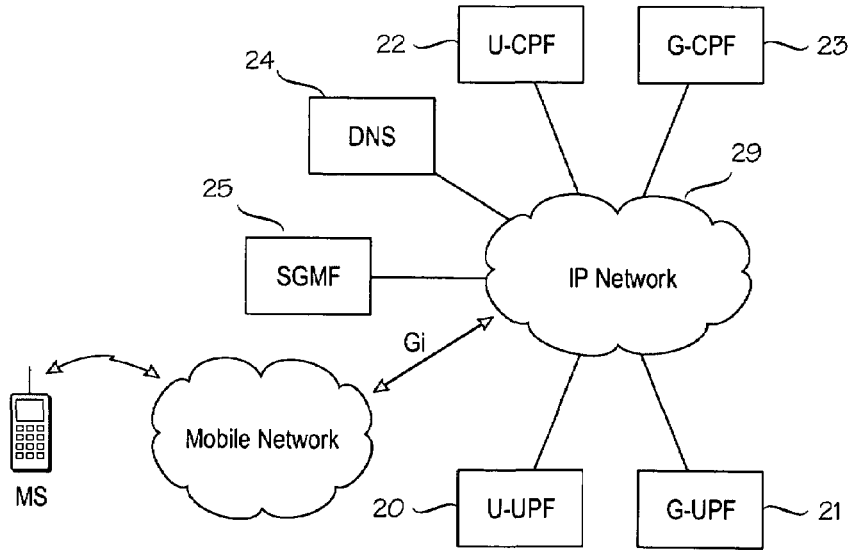

In FIG. 3, one possible general PoC architecture is presented. The IP backbone 29 may be, for example, an IP mobile backbone, a LAN, a PoC intranet, or two or more separate intranets, etc.

PoC mobile MS, when the PoC mode is selected by the user sets up two GPRS contexts: a) one to the PoC CPS 11 to be used with TCP/IP for control plane signalling (group management, registration etc.), b) one for voice to/from the PoC bridge 10 using RTP,UDP, conversational IP quality class or similar, and sufficient header compression over the radio path. If a mobile or the mobile network do not support two simultaneous contexts, the mobile must clear down the RTP connection for the duration of the SIP signaling transaction. The PoC mobile MS must always maintain the contexts to the bridge 10 when the PoC mode is on. The SIP content is also preferably on all the time, but if this causes problems to network capacity or to the accessibility of other services than PoC, the SIP context can be set up also for the duration of signaling transactions. Notice: in this case the cellular network must support the network initiated context set up. The SIP sessions are signaled in power on or in PMR mode activation. The SIP sessions are always on and thus no SIP signaling is needed for PMR voice items. All voice is transmitted after PTT activation via the existing contexts. This mechanism enables fast call set up.

An example of the allocation of the uplink bearer at the radio interface of the mobile RAN is illustrated in FIG. 4. The user pushes the PTT and the MS sends a speech item request to the mobile RAN. The MS will ask for a dedicated radio bearer for the duration of whole speech item. The mobile RAN grants the uplink bearer (e.g. a dedicated packet data channel and the physical time slot). When the mobile RAN acknowledges allocation of the uplink bearer, the mobile starts sending data through it. The first packet sent is an RTP message containing the talking party identifier followed by voice stream packets (VoIP RTP packets). The leader RTP packet and the VoIP RTP packets are routed to the PoC bridge 10 on the basis of the active GPRS context.

The PoC bridge 10 multiplies the packets and sends them to the other members of the group. An example of the allocation of the downlink bearer in the radio interface of the mobile network is illustrated in FIG. 5. The downlink bearer is allocated by the SGSN when it detects an IP packet going via an existing context to a mobile station MS. Firstly, the SGSN pages the MS if it is in a STANDBY state. After receiving an acknowledgement from the MS, the SGSN requests that the RAN (e.g. the GSM BSS) allocates a dedicated radio bearer, and after the allocation the SGSN starts sending packets (e.g. in LLC frames) to the RAN. The RAN sends the packets (e.g. in radio blocks) to the MS.

The uplink voice bearer is released by the MS when the user stops pushing the PTT switch. The network will release the uplink bearer when the maximum speech item length (e.g. 20 to 30 sec) is exceeded. In the downlink direction the radio network may release the bearer when no IP messages associated with the bearer have been received for a predetermined period of time (so called idle timeout).

The call set up delay experienced by the caller after pressing the PTT switch may be shortened by the mobile station MS giving an audible indication to the user to start speaking. After the audible tone, the user can start speaking and the VoIP message starts. This is the time the caller experiences as the set up delay. There are several points at which the permission to speak can be given. For group calls, one suitable point is after the uplink radio bearer has been allocated and after the first RTP message (so called leader packet, non-voice) has been sent to the RAN.

In one-to-one calls, the indication to start speaking can further be received from the called party. Notice that when the first RTP packet is sent to uplink, the downlink status is not known at that point. In case of call failure because of a missing B party or missing radio bearers in the downlink direction or a failure of a call authorization check, the user gets an indication of a call failure. The indication to speak could be alternatively given after the bridge 10 gives an acknowledgement of, for example, having processed the first RTP packet or, in the one-to-one calls, after the B party has acknowledged the leader packet. Still alternatively, the MS could have a timer value set by the CPS from sending the lead packet to giving the audible indication to the user.

Group Communication

Groups (also called talkgroups) provide the users with an easy and immediate multipoint way for voice communication. Each user can be allowed access to one or more groups. A typical case is that a mobile user is allowed access to all groups in his Virtual Private Network (VPN). The user can be actively attached to a subset of the available groups.

In the basic mode, the mobile user selects one group for communication. He will then hear all traffic in that group (unless he is engaged in an individual call) and can also talk in the group. The user can easily switch to another group.

The user can also operate in multiple groups virtually at the same time, by using a method called scanning. The user selects multiple groups and assigns these with priorities. He then hears traffic from one group at the time, but traffic from a more important group will interrupt other traffic. One of the groups remains the selected group, and any speech transmission by the user is made to the selected group. The user can switch scanning on and off. The list of scanned group with priorities can be edited by the user. Group selection and changing of other settings can also be performed by someone else than the user himself.

The user interface for receiving and talking in groups, changing the selected group and activating scanning is simple and fast. Other tasks, such as defining the scanning list are used less often.

PMR-style One-to-one Communication

As an option, the architecture according to the invention can be used to enable the users to make direct one-to-one calls to other users within their defined access rights (default: within their VPN). A direct one-to-one call resembles the use of an intercom rather than the use of a normal telephone. Such calls are well suited to many PMR users: tasks, commands and advice can be given and received with minimal attention to operating the mobile station. Activities can be coordinated with good timing accuracy without having to keep a call on during long periods. Basically, an one-to-one call is only a special case of group communications, and the same principles can be used.

Management Plane Operation

In the following, the preferred embodiments and different aspects of the invention are discussed on the management plane, control plane and the user plane of PoC.

User and Group Management

With MS equipment, users may be able to browse the possible groups and subscribe to them. They may also be able to leave the groups. For more professional use, forced joining and removal to/from groups is needed. It is desirable that the group management is produced via a WEB/WAP browser based service.

First of all, users must be created in PoC system. This is done by accessing SGMF 25 using a WAP/WWW interface. All user and group management operations can be performed by a management user, who can access SGMF using a MS or can be directly connected to SGMF.

Secondly, groups need to be created before they can be used for communication. Creating groups and defining their access rights belongs to what is called group management. Many user groups or end user organizations are expected to outsource their group management, but some will prefer to have access to creating groups and defining group members and access rights. On the other hand, not all users need to create new groups (e.g. ordinary workers using PoC). Therefore, it is better to have a separate concept of management user in the PoC system. In the preferred embodiment of the invention the users can have a remote access to a Subscriber and Group Management Function (SGMF) 25 provided by the operator and shown in FIGS. 2 and 3. SGMF may provide a group managing user interface using WAP/WWW forms. However, other types of user interfaces are also possible.

An overview of the group management concept is shown in FIG. 6. Group management is used by management users 61 to create groups for the use of users 62. The users 62 can be actively engaged in a group (an active group session is established) or they can have groups bookmarked in the group list 63 of their MSs for easy use later. Furthermore, the users 62 can have been allowed access to yet other groups. A user 62 can activate a session in such groups, e.g. by typing the URL of the group (such as 'football@publicgroups.operator.fi') or clicking a link on a web or WAP page. The management users 61 can be either 1) normal users creating or modifying groups for personal or business use, 2) office personnel creating or modifying groups for company use, 3) dispatchers creating or modifying groups for their PMR fleets, or 4) operator or service provider personnel creating or modifying groups for their customers' use.

First of all, SGMF 25 must hold information on authorized management users and what they are allowed to do. The information may include settings like: 1) which operation the management user is permitted to use (e.g. create, add/remove access rights, send notifications); 2) which groups he is allowed to manage (e.g. own private groups, any groups of company-k, any public groups of provider-x); and 3) which users he is allowed to include (e.g. any, any users of company-k, a list of persons) in the groups.

Then let us consider an example case wherein an authorized management user 61 creates a group. In an embodiment of the invention, the group data created at this point may include: 1) the home CPS 23 of the group; 2) the URL of the group (dependent on the home CPS 23); and 3) the initial access rights settings for the group (can be changed later). The group creation/management application may now perform e.g. the following actions: 1) update the DNS server 24 of the URL if necessary (typically there should be no need if existing domain names are used); 2) update the CPS 23 with the group name; 3) and update the PoC database or directory (PoC main information repository) 65.

The management user 61 may at this point also want to send a notification of the new group to potential group members. For instance we can see the following typical cases: 1) the management user 61 is a private person who has created a group for five persons he knows, access to the group has been restricted to these five persons, and the user wants notification to be sent to these five persons; 2) the management user is a service provider who has created a group for hobbyists, access to the group has been set open to all, and the notification is sent to a list of users who according to marketing research are likely to be interested.

The notification of a new group is, for example, a special form of SMS message (e.g. ring tones, logos), or a SIP instant message. The MS may react to this message by e.g. 1) displaying to the user that a new group is available to this user; 2) giving the MS user a choice of joining immediately (starting an active session; normal or sticky) or bookmarking for later use, or rejecting (a reject message will be sent to SGMF which may display it to the management user). The rejection indicates to the application that the user does not accept the group, but this does not necessarily have to result in modifications to access rights data.

As noted above, new groups will be added by the SGMF to the relevant G-CPF 23. Likewise the SGMF can also delete groups. The G-CPF 23 is not directly involved in creating groups otherwise. After notifications have been sent to users, the users who wish to join the group immediately appear to the G-CPF 23 as users establishing a SIP session to a group. Now, G-CPF 23 inquires group access rights from the SGMF 25 which in turn makes an inquiry to PoC database or directory (PoC main information repository) 65.

The removal of a user's group access rights affects only the PoC database or directory 65. Any ongoing sessions are therefore not affected, and the change becomes effective at the next session set-up. If a user has to be removed from a group, a separate facility for that may be implemented to the G-CPF 23. The deletion of a group is indicated by the SGMF 25 to the appropriate G-CPF 23. The G-CPF 23 will then end all active sessions and remove any stored information on the group. The SGMF 25 also takes care of removing information in the PoC database or directory 65.

Group access rights are checked by the CPS at the time when a group session for user equipment is started. Additional checks can be made at other times if deemed necessary to maintain security. In the preferred embodiment of the invention, the group access rights are held in the database or directory 65 which is then inquired by an appropriate server. The typical inquiry takes the form "is user-x allowed to access group-y?".

The access rights definition is preferably flexible and possible both on the level of individual users/group and on lists of users/groups. For instance, one should preferably be able to define: 1) user-x allowed to access group-w; 2) user-x, user-y, user-z allowed to access group-w; 3) user-x allowed to access all groups of company-k; 4) all users of company-k allowed to access group-z; 5) all users of company-k allowed to access all groups of company-k; 6) all users allowed to access group-p; 7) etc.

Therefore, the access management preferably uses a hierarchical structure for both users and groups. This means that users can belong to user groups and groups can belong to group groups, even on multiple levels. It would also be even more flexible if a single user could belong to multiple (parallel) user groups. Group access can be given to a specific user or to an entire user group. Access given to a user group admits all users in that user group. A user can be given access to a specific group or to a group group. Access to a group group admits into all groups in that group group.

Control Plane Operation

User Log on to PoC Services

Before the user can start to use PoC services he has to register himself to his U-CPF 22 whose actual IP address has to be determined by DNS services. In the preferred embodiment of the invention the user first makes a DNS query containing the host part of his SIP address. The DNS 24 returns the IP address of the U-CPF 22 corresponding to the host part.

Figure 7:
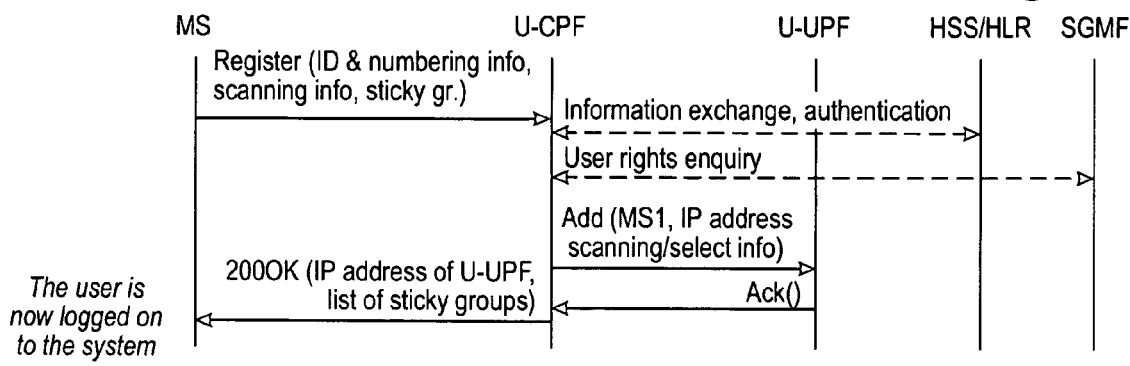
FIG. 7 is a signaling diagram illustrating user log-on to PoC services.

Referring to an example shown in FIG. 7, once the MS knows the IP address of the U-CPF 22 it sends a SIP registration message to the U-CPF 22. When the U-CPF 22 receives the registration message from the user's MS it contacts SGMF 25 for checking rights of the user and obtaining other information. After this, U-CPF 22 contacts U-UPF 20 of the user where his input checking and scanning filtering process has to be performed and where the user has to send his user plane traffic. The user is then added to the U-UPF by an Add message, and the U-UPF initializes the user's scanning process and sends an acknowledgement. Optionally, before contacting the U-UPF 20, the U-CPF 22 may exchange user information with the Home Location Register (HLR) or 3G Home Subscriber Server (HSS) of the user, authenticate the user and create a user profile.

During the logon the user gets the IP address of his U-UPF 20, and possibly a list of user's sticky groups (explained later).

The registration message normally includes the identification information of the user, but the message can also include other relevant indications. It can be re-sent by the user in order to make a new logon and to request particular information from his U-CPF 22.

In order to avoid the log-on of different users to the system by the same terminal, which would require more than one scanning processes for the same IP recipient, a specific checking mechanism may be performed by the U-CPF 22.

In case the user wants to update his scanning settings or set ON/OFF his scanning process, then he can send new specific SIP registration messages to his U-CPF 22. If the user wants to select a certain group (scanning being set off), it is done by sending a SIP INFO message to user's U-CPF 22. In case the user has sticky groups (permanent groups), they are activated at logon: the U-CPF 22 performs the consequent operations required, such as SIP session invitation, mapping settings in the G-UPFs 21 and the U-UPF 20, and finally provides the resulting information (for example the list of the sticky sessions which the user has implicitly joined) to the user in the logon acknowledgement message.

Active Group Sessions

A user communicates (listens and talks) in groups for which he has an active session. Sessions are set up and ended by SIP signaling. The session setup can be initiated both by the user or by an authorized third party (such as a dispatcher or an application). Session establishment by a third party is mainly relevant only in PMR use. Many users, especially in the non-PMR market are likely to dislike session establishment by a third party and may like to be able to prevent this. The sessions may also be forcibly ended by the G-CPF 23, e.g. in case of group deletion.

The primary and effective data on the active group sessions is always held by the server(s). Thus, if the user equipment (e.g. the MS) has lost data on active sticky group sessions, it can request all necessary group information from U-CPF by performing a new logon.

In many applications the user may continue using the same groups after a power-off period. For this purpose, sticky sessions are provided. When the user is logged off, the information related to user's sticky sessions is saved in PoC database or directory (PoC main information repository), and the sessions are re-established at power on. In other words, sticky group is talk group that is automatically activated after a new logon.

For activating a group session, the MS needs to know the URL of the group. From the user's point of view, he may (user decision, depends on what options have been implemented) select the group by 1) typing the full URL of the group (e.g. sector2@hkl.grpcps.operator.fi, football@publicgc.operator.fi).

2) selecting from groups stored in the MS in a group bookmark list.

3) using a WAP/WWW application to browse available groups.

All these methods are complementary and can be compared to corresponding methods in web browsing: typing the URL, selecting from the bookmark list, clicking on a link on a web page. The outcome in all three cases is that the MS knows the URL of the required group and can start SIP signaling.

Setting up a session by the user may (if this facility is implemented and the user decides to use it) be based on an URL of the group given by the user. This allows any user to try access to any group; access rights checking will then be performed by the server(s). Another method for occasional access to groups would be using a web/WAP browser to browse for interesting and/or useful groups. Both of these methods are very suitable to occasional and temporary access to groups.

However, if the user needs frequent access to some groups without having to keep the session open all the time, the user equipment may include some form of group bookmark list. The main purpose of the group bookmark list is to allow the user to browse locally the list of groups and easily attach to groups. Please note that there is no need for the group bookmark list in the user equipment to be complete and include all groups available to the particular user. If a group is missing, the user can access the group by giving its URL and then store it on the list.

From the user's point of view, the group bookmark list may be perceived as the traditional PMR group or channel selector. Other types of users may perceive the list as a second phone book, an internet bookmark list or similar to TV channel settings. This set of models is enough to cover all likely users of the service.

There are a few options as to how the group bookmark list works, depending on the type of the intended market (PMR or consumer). For PMR, the user interface should resemble a traditional PMR group list, and a facility to remotely load new groups to the group list (from a system manager) will be needed. For consumer users, the user interface might resemble more a bookmark list to which the user can add groups himself (e.g. bookmarking the group currently selected). A PMR user would naturally also benefit from the facility of bookmarking the current group. At this stage, we can assume that the deletion of groups from the list is the user's responsibility. For PMR users, automatic bookmarking could be useful, i.e. that all new groups will automatically be bookmarked.

User Plane Operations

Signaling a PoC Group Speech Item

The user has to send all his user plane traffic to the U-UPF 20, and in case the traffic is destined to a group then the specific port number associated by the U-UPF 20 with the group is used for traffic identification purposes.

One common PMR requirement is that only one active member at a time is allowed to speak in each group and that means that a user willing to speak to a selected group has to get a speech item that is managed by the system. The speech items are granted and rejected by the G-UPF 21.

The straightforward way to support this functionality would be to use SIP signaling, but in order to avoid the delay introduced by the explicit signaling transactions an alternative solution that uses the payload type field and the payload itself of the RTP packet for implicit signaling is here preferred.

Thus, in an embodiment of the invention, the system is not based on request-grant type management of talk spurts such as is used in conventional PMR systems, i.e. TETRA. Rather, to provide faster operation, a user will start the transmitting talkspurts without a talkspurt grant from the system, but in case of clash of multiple talkers (or other problems) the right to transmit will be withdrawn.

Figure 8:
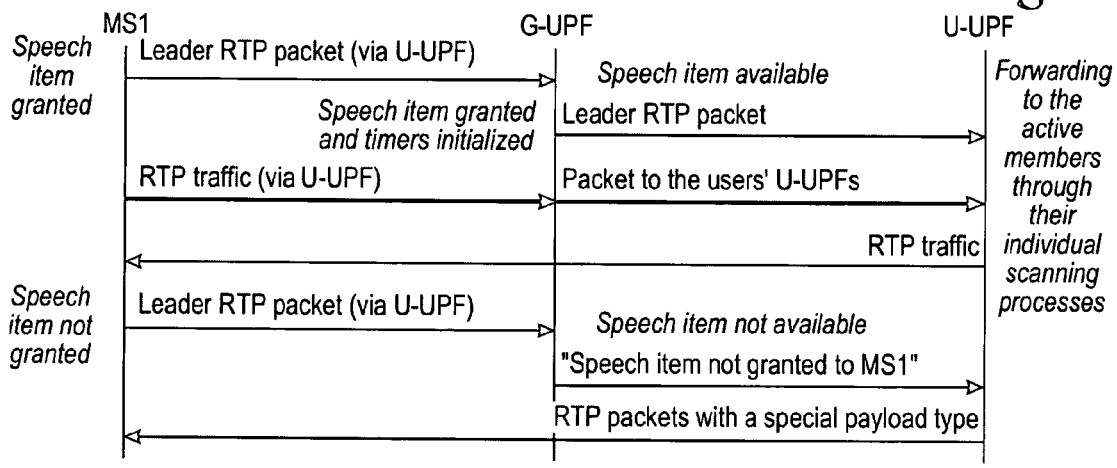
FIG. 8 is a signaling diagram illustrating signaling relating to the management of a group speech item.

With the implicit signaling approach mentioned above each user can try to speak to the selected group whenever he wants. Referring to an example of FIG. 8, when the user of the MS pushes the PTT, the uplink resources are reserved as described above, and the MS sends a leader RTP packet to the G-UPF 21 via U-UPF 20. A speech item is available and granted to the MS. At the same time, timers which are to be described below are initialized. The leader RTP packet is forwarded to all the receiving active members of the group via their respective U-UPFs, in order to indicate the current speaker's identity to all the receiving active members of the group each time an active member gets the speech item and starts to talk to the group. This leader packet uses a special payload type for embedded control signaling as well as the RTP payload, to carry information about the sender's identity (mnemonic, number, etc.), and an SSRC value that will be used to recognize the following RTP packets sent by the same speaker. Then the leader RTP packet is followed by the actual group's audio stream (VoIP RTP packets).

Normally, when the speech item is not available and the G-UPF 21 does not grant the speech item to a user in response to receiving the leader RTP packet, the user notices that his voice is not forwarded when he receives another member's voice from the same group traffic. However, this would not be enough in case the user is simultaneously listening to another group, so the G-UPF 21 of the group has to signal to the user's U-UPF 20 (using embedded RTP signalling) that the user has not got the speech item requested. The user's U-UPF 20 will then send this special RTP packet forward to the user. This packet indicates to the user terminal that the speech item was not granted to him and allows the MS to switch on some hardware mechanism (such as visual or sound indication) to alert the user.

Since the speech item is managed by implicit signaling, there is no need for further specific explicit signaling during a group communication.

Each G-CPF 23 generates unique SSRC values for the users attaching to groups. During the group attachment the G-CPF 23 returns this SSRC value to the user and stores it in the G-CPF 23 and G-UPF 21. It should be noted that in this context the SSRC uniquely identifies the user in the context of a group while a different SSRC associated by the U-UPF 20 for user's every one-to-one call indicates the caller in a one-to-one call, and the same value is used in that call for both the caller and the called party.

The user's traffic forwarded by his U-UPF 20 is then identified by the IP address of the G-UPF 23 that is handling the group to which the traffic is destined, and the specific port number that the G-UPF 23 has allocated for the traffic of that group.

Talkspurt Timers in Input Filtering

Traffic in a group, as seen by the users, consists of talkspurts (i.e. speech items) of more or less continuous speech coming from a specific user. The U-UPFs 20 and G-UPFs 21, however, receive packets of speech, and multiple users may try to speak simultaneously in the same group. To ensure that speech from the current speaker in the group is not interrupted or interfered with by packets from other users, the G-UPF 21 implements a talkspurt continuity timer for each active group. In addition to the timer, the identity of the currently talking user is stored.

In a typical talkspurt, while the user is pressing PTT, his speech codec is generating speech packets (frames) and these are being sent at regular intervals. Of course, the packets will reach the G-UPF 21 at somewhat more irregular intervals. Even when the user is not speaking, the MS will be sending DTX packets (Discontinuous Transmission). The timer is thus needed to keep a soft state between packets. The timer is restarted for every incoming packet, and the timer value should be enough to allow for the interval between packets, taking into account the interval between packets sent (e.g. DTX frames) and the variation of delay between the user and the G-UPF 21. The timer value is thus on the order of hundreds of milliseconds.

The idea is not to keep the turn reserved for the user if he releases the PTT. Therefore, an embodiment of the invention uses a trailer packet to signal the end of the talkspurt, and this should then be considered equivalent to the expiry of the timer. The talkspurt continuity timer is implemented in G-UPF 21, because it is there that different talkers are contending for talking in the same group.

There is also a requirement to limit the maximum talkspurt time. From the user's point of view, no single user should be able to occupy the group unnecessarily long, preventing others from talking. Neither should the group be blocked if the PTT of a user is unintentionally jammed in the send position. The operator may want to restrict the talkspurt duration for reasons of profiling the service and tariffing. Typical values for the talkspurt maximum timer would be 30 s, 60 s, even more. The timer is started at the first packet, when the user becomes the current talker. At the expiry of the timer the talkspurt of the current speaker will be stopped, even if there is no other speaker. To be able to talk again, he will need to release the PTT and push it again. A special embedded RTP signaling packet is sent by the G-UPF to the MS in order to stop the sending.

Figure 9:
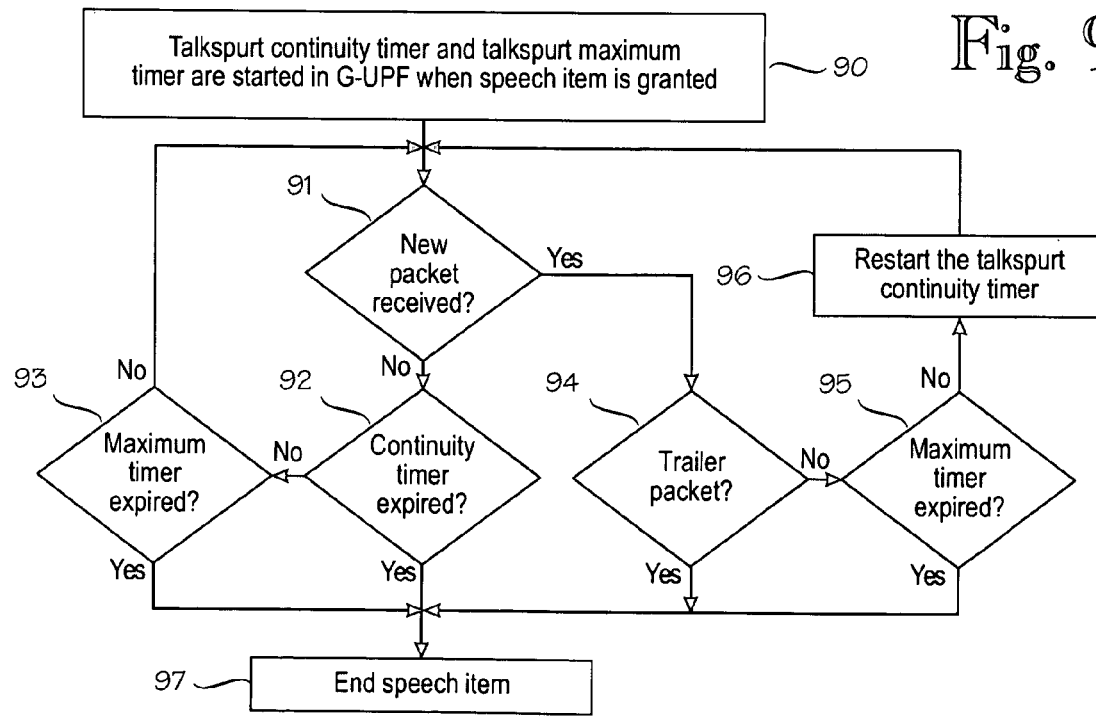
FIG. 9 is a flow diagram illustrating the management of a PoC group speech item by talkspurt timers.

It is possible to implement the talkspurt maximum timer either in the U-UPF 20 and in the G-UPF 21 or in both, but the result is not the same in the two cases. A timer in the U-UPF 20 implements a user specific maximum talkspurt duration, a timer in the G-UPF 21 implements a group specific maximum talkspurt duration. Either of these can be useful, even both. The architecture supports both FIG. 9 is a flow diagram illustrating the talkspurt timer process in the G-UPF 21. The talkgroup continuity timer and the talkspurt maximum timer are started when a speech item is granted to a user, step 90. In step 91, it is checked whether a new packet has been received from the user. If not, it is checked whether the continuity timer has expired (step 92). If the continuity timer has expired, the speech item is ended (step 97). If the continuity timer has not expired, it is checked whether the maximum timer has expired (step 93). If the maximum timer has expired, the speech item is ended (step 97). If the maximum timer has not expired, the process returns to step 91. If a new packet has been received from the user in step 91, it is checked whether the received packet is a trailer packet sent by the user equipment in response to a release of the PTT (step 97). If a trailer packet has been received, the speech item is ended (step 94). If the received packet is not a trailer packet, it is checked whether the maximum timer has expired (step 95). If the maximum timer has expired, the speech item is ended (step 97). If the maximum timer has not expired, the talkspurt timer is restarted (step 96) and the process returns to step 91.

A mechanism to interrupt a talkspurt may also be needed. This could be when an authorized user needs to override an ongoing talkspurt. A G-CPF 23 may then be able to command the G-UPF 21 either 1) to interrupt a talkspurt in a group, or 2) to set a user to have an interrupting priority in a group. In case 1, any ongoing speech item in the group shall be interrupted, as a consequence no-one has the speech item and a command to stop transmitting (embedded RTP signaling packet) is sent to the MS of the interrupted talker. In case 2, a speech item from the prioritized user will cause sending of a stop transmitting command to the previous talker, restarting of the talkspurt timers and granting the speech item to the new talker. It is assumed that interrupting priority is only used temporarily, on demand or in special cases. Therefore, the number of users with interrupting priority per group does not have to be large (assumption=1).

In the preferred embodiment of the invention, the command to stop transmitting is achieved by the use of an RTP packet using a special payload. A parameter field in this packet may indicate the reason for command. These packets shall pass through any filtering processes unhindered. An MS receiving the command to stop transmitting immediately stops transmitting voice packets and return to the receive state, as if the PTT were no longer pressed. The user will start to hear any incoming voice traffic even if he holds the PTT pressed. To start transmitting again, the user must first release the PTT and press it again. The command to stop transmitting is either generated or routed via the U-UPF 20.

Downstream Suppressing while Transmitting

Figure 10:
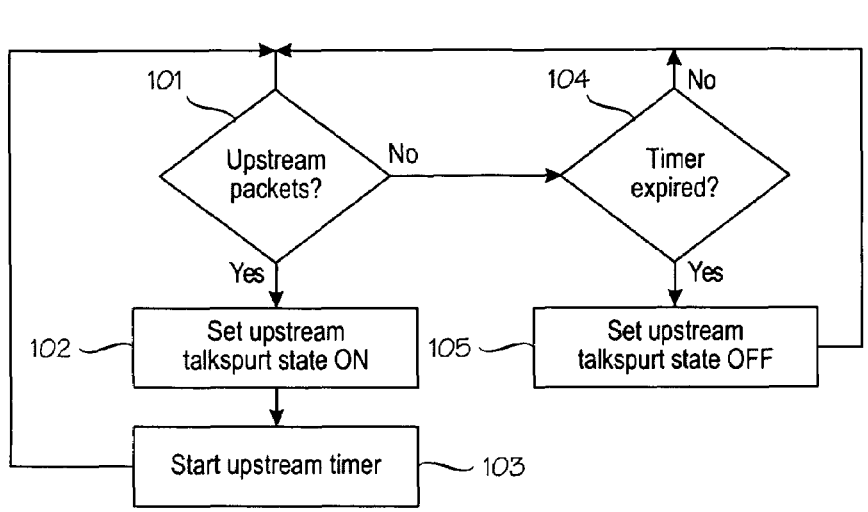
FIG. 10 is a flow diagram illustrating the downstream suppression by an upstream timer.

The semi-duplex mode of operation makes it undesirable to load the downstream channels with voice packets while the user is transmitting. Therefore, in an embodiment of the invention, the U-UPF 20 implements a suppression of downstream while transmitting in the following way. Referring to FIG. 10, the upstream traffic from the user concerning group calls is monitored for leader and voice packets (step 101). An upstream talkspurt timer shall be used to provide a soft state indicating that the user is transmitting a talkspurt in a group call. The mechanism used is the same as described above for maintaining talkspurt continuity in a group. An upstream voice or leader packet will set the upstream talkspurt state ON (step 102), and start the upstream talkspurt timer (step 103). Expiry of the timer (step 104) will set upstream talkspurt state OFF (step 105). When the upstream talkspurt state is ON, no downstream packets (except signaling) is sent to the user. When the upstream talkspurt state is OFF, downstream packets are sent normally.

Audio Data Distribution in User Plane

In the user plane the audio data real-time distribution to/from the end users is handled, and the PoC Bridge 10 (the G-UPF 21 and the U-UPF 20) is the network element responsible for that. When multiple bridges/proxies are involved in the same PoC communication, their work is controlled and coordinated by the PoC CPS 11 (the G-CPF 23 or U-CPF 22) that is handling the corresponding SIP session.

It is an object of the invention that the PoC approach is scalable to millions of users and at least hundreds of thousands of groups. To provide a scalable PMR solution a specific addressing model has been planned. The principal aim of this model is to implement the complex mapping between the bridges, the users and their traffics using the strictly needed amount of IP addresses and port numbers and preferring static allocations (where possible) in order to reduce the amount of information to be exchanged between the network entities.

The IP/UDP/RTP protocol stack is commonly used in the VoIP world for real-time audio data transmission, and thus it is selected for the user plane in the preferred embodiment of the invention as well.

In particular it is assumed that at least in the users' terminals the IPv6 is implemented, while in some core network entities it could be required to support the IPv4 also (dual IPv6/v4 stack) in order to assure the interoperability with eventual subnetworks still using it.

The Real-time Transport Protocol (RTP) developed by the IETF to support the transport of real-time streams for audio communications over packet networks is used on top of the UDP in order to avoid the delays introduced by more reliable transport protocols (not required in this context), such as the TCP. With the RTP and latency buffering at the receiving endpoint, the timing (jitter problem), packet ordering, synchronization of multiple streams, duplicate packet elimination and continuity of the streams can be handled.

When a user speaks to a group, the user's MS sends the audio packets to his U-UPF 20 which after the input checking forwards it to the group's G-UPF 21. The traffic forwarded by the U-UPF 20 is uniquely identified by the IP address of the G-UPF 21 and the port number the G-UPF 21 has associated with the group, while the traffic between the user and his U-UPF 20 is identified by the IP address of the U-UPF 20 and the port number the U-UPF 20 has associated with the group, so the MS can use the same socket to send and receive traffics from any groups (port number "200" is used in the following examples).

When a user becomes an active member of a group he gets from his U-CPF the port number assigned by his U-UPF to the group's traffic. And at the same time the U-CPF 22 and the G-CPF 23 set the proper mappings between the user's U-UPF 20 and the group's G-UPF 21. More specifically, the U-UPF 20 gets the port number that the G-UPF 21 has assigned to the group's traffic.

A U-UPF 20 identifies incoming one-to-one traffic by the specific port number it has allocated for all one-to-one communications and the SSRC value assigned by the U-UPF 20 of the caller to the one-to-one call during its establishment. In order to avoid the negotiation of dynamic port numbers between the MSs and the U-UPFs 20, a static port number shall be used in all the MSs and U-UPFs ("102" in the following examples).

With the "split bridge" model described above it may happen that in the downlink a G-UPF 21 has to forward the incoming group traffic to separated U-UPFs 20. For that kind of communications, as well as for communications from a U-UPF 20 to G-UPF 21, port numbers assigned for each group are used.

In order to better describe how group calls are managed on the user plane, an example will now be illustrated. The current group's speaker sends his audio packet to his U-UPF 20 that checks the packet and forwards it to the group's G-UPF 21. If the traffic passes the input filtering in the G-UPF 21, then it is individually delivered to the scanning processes of the active members directly handled by the local U-UPF (located in the G-UPF physical entities). At the same time the traffic is also forwarded to the other U-UPFs involved, which will then serve their own active members.

Figure 11:
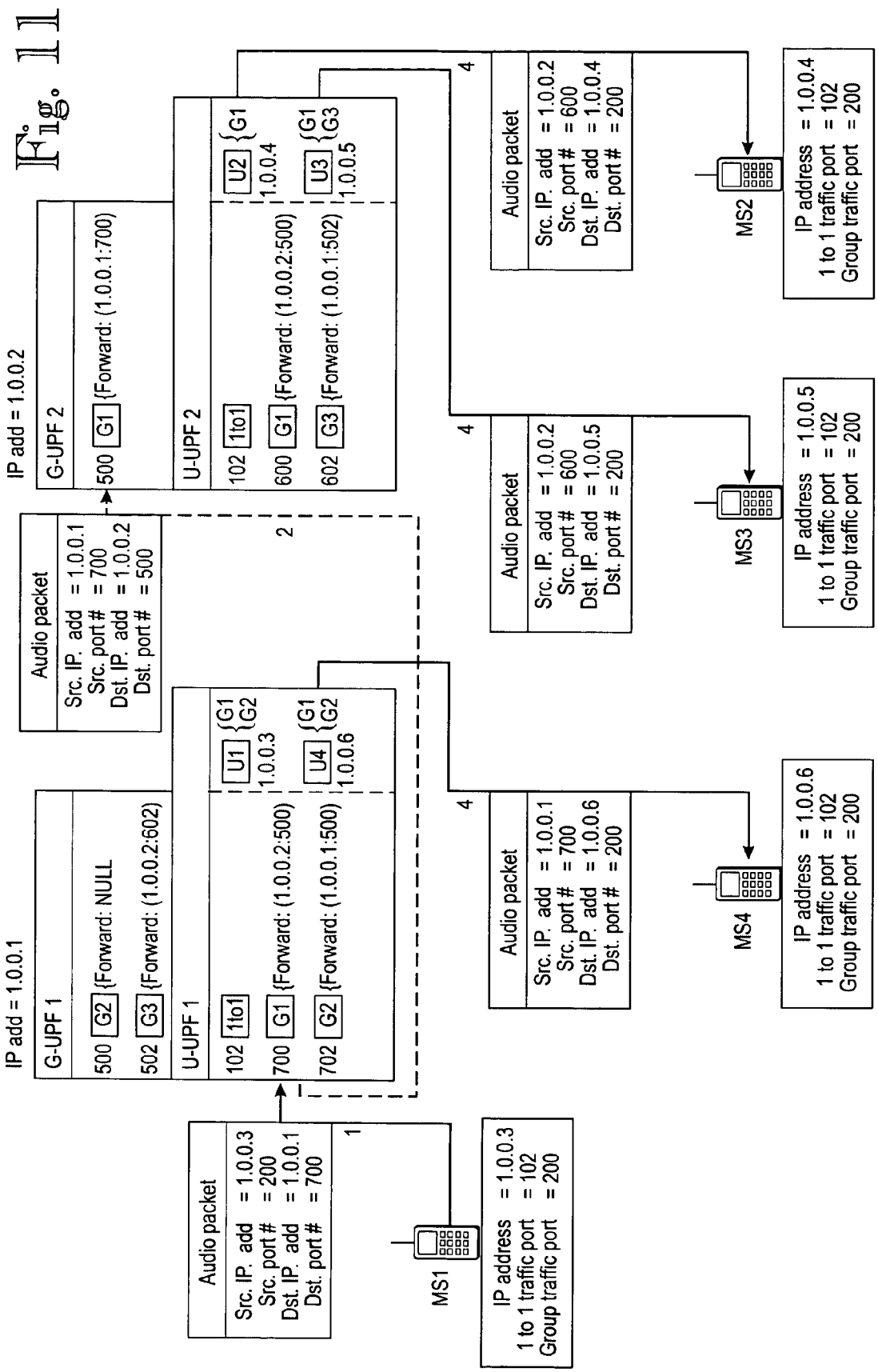
FIG. 11 is a block diagram illustrating user-plane group communication with two bridges involved.

An example of a group communication with two bridges involved is illustrated in FIG. 11. The G-UPF 1 and the associated U-UPF 1 have the IP address 1.0.0.1. The G-UPF 1 and the U-UPF 1 have ports 500 and 502, and 102, 700 and 702. The G-UPF 2 and the U-UPF 2 have ports 500, and 102, 600 and 602. In both bridges port 102 is allocated for the purposes described above. The other ports are allocated to groups G1, G2 and G3, as can be seen in FIG. 11. The Forward operation in some of the ports means that a packet received to the respective port must be forwarded to an IP address and the port indicated. Mobile stations MS1-MS4 have the IP addresses as well as the one-to-one ports and the group traffic ports shown in FIG. 11. The U-UPF 1 has been assigned to the Mobile stations MS1 and MS4. The U-UPF 2 has been assigned to the Mobile stations MS2 and MS3. The MS1 belongs to groups G1 and G2, the MS2 belongs to group G1, the MS3 belongs to groups G1 and G3, and the MS4 belongs to groups G1 and G2.

Let us now assume that the MS1 sends an audio packet 1 with a destination IP address 1.0.0.1 and a destination port 700. Consequently, the audio packet 1 is routed to the port 700 in the U-UPF 1. The port 700 has been allocated to the group G1, and therefore the U-UPF 1 multiplies the packet to all its users belonging to the group G1. In this case the audio packet 4 is sent to the MS4. The port 700 in the U-UPF 1 has also a Forward function to the IP address 1.0.0.2 and the port 500. Therefore, the U-UPF 1 sends a replica of the audio packet 1, i.e. the audio packet 2, to this destination. As a consequence, the audio packet 2 is routed to the port 500 in the G-UPF 2. The port 500 has been allocated to group G1, and therefore the U-UPF 2 multiplies the packet to all its users belonging to the group G1. In this case the audio packets are sent to the mobile stations MS2 and MS3.

The port 500 in the G-UPF 2 has also a Forward function to the IP address 1.0.0.1 and the port 700. Therefore, the G-UPF 2 sends a replica of the audio packet 2 to this destination. As a consequence, the audio packet is routed to the port 700 in the U-UPF 1.

Multi-unicast

As described above, one aspect of the invention is that group communication in a mobile radio system is implemented using a group server, which receives voice packets addressed to a group and eventually forwards (via U-UPF) these voice packets individually to each group member. The group server provides a number of groups (G1 . . . Gn). A group member sends voice packets to the group server (via U-UPF); each packet is addressed to the group server but it also carries the identity of the group (G1 . . . Gn). The group server holds a table, for each group, containing U-UPF addresses of group members and U-UPF holds a table, containing individual addresses of users.

Figure 12:
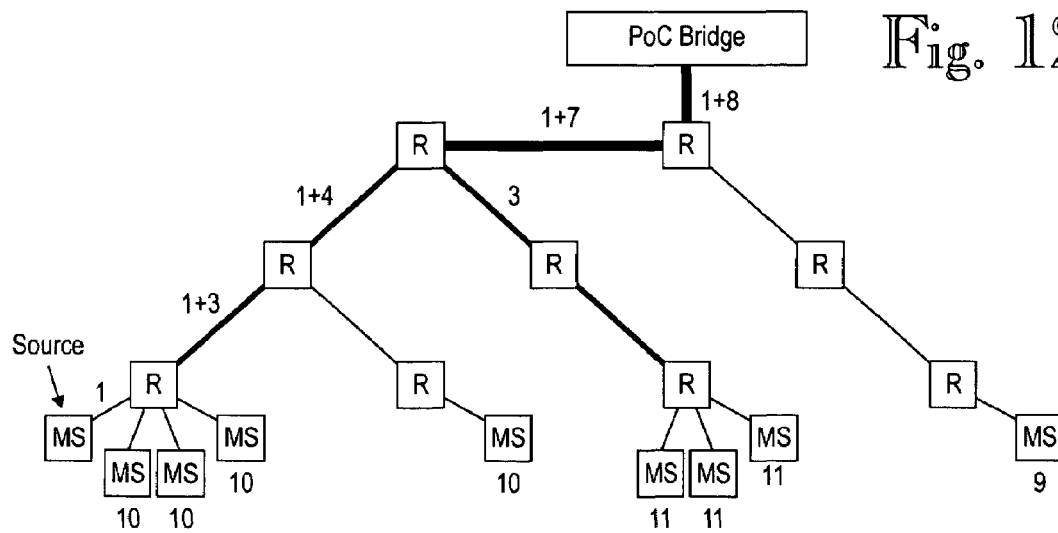
FIG. 12 is a diagram illustrating the multi-unicast concept.

In the example illustrated in FIG. 12, the source MS sends just one stream in the uplink, but then the PoC Bridge multiplies it for eight different recipients. On top of each link the number of streams transported in the uplink and in the downlink are respectively indicated, and each receiving MS is labeled with the number of hops needed by the packets to reach the respective MS. The reference symbol R represents any routing node in the system.

This concept is called multi-unicast herein. This concept is a non-traditional method for implementing group communication in a mobile radio network, and it greatly reduces the complexity of implementation of group communication services.

The core issue of group communication is how to deliver the communication to group members in an efficient manner in a mobile radio system. These systems may range in size from very small (from one base station) to nation-wide (thousands of base stations). Likewise the groups may be of different, even varying sizes. Even more difficult, the geographical distribution of a group can be anything from very local to nation-wide, and vary according to the circumstances. In other words, the problem in hand is how to deliver the group traffic to each group member reliably regardless of the location of the member and the distribution of the members.

Traditional radio systems were small and groups usually local. Therefore the obvious solution was to use one transmission per base station for each group active in a specific area. The transmission was identified by a group address (multicast). The prior art approach involves many problems in a large communications system. Firstly, when a group call is made, the system needs to know which base stations to use for the call. Thus the system needs to implement a separate mobility management subsystem to keep track of the location of group members for each group. This causes a significant increase of the complexity of the system and can become the primary factor in the total processing load. Secondly, in order to receive group traffic, a mobile station has to hold the proper group addresses. Therefore, for everything to work properly, group membership must be known beforehand to both the mobile station and all the relevant system elements. This requires a distributed data management subsystem which has to operate over an unreliable and very low bandwidth radio channel.

These problems characterize the current state of the technology. The prior art systems circumvented the problem by not trying to optimize the use of base stations at all. Traffic of a group was radiated on a fixed, predefined set of base stations, thus relieving the need for mobility management for groups. This meant also that the system did not have to know the group members, and the group addresses were programmed into the mobile stations.

By means of the multi-unicast concept according to the invention, group communication in a large mobile system can be implemented reliably without adding large subsystems, which cause huge processing load and are prone to errors during operation—giving the users an experience of unreliable service. Because group traffic be delivered to recipients using the individual addressing and the basic mobility management of the system, group traffic becomes as reliable as individual traffic.

It can be argued that using individual delivery is more resource consuming than multicast delivery. This certainly was true in traditional PMR systems which were based on a large cell size; therefore a significant number of group members could be located within the range of a single base station. In modern cellular networks the use of large cells is inefficient from point of view of the frequency utilization, smaller and smaller cells are being deployed and therefore the probability of group members being located in the same cell is decreasing.

It should be noted that the basic architecture of the invention can also use some multicasting mechanism for audio data distribution, but that would require muticasting functionalities at the RAN with the above problems. Anyway, in this case it may be still reasonable to support both unicast (multi-unicast) and multicast distribution techniques in order to get benefit of unicasting where it is more efficient, for example when few members of a group have to be served at a site, or where multicasting is eventually not supported.

Scanning Filtering

In the current PMR system all traffic addressed to a user is delivered to his terminal which locally performs the filtering function to play out the single traffic that the user wants to listen to. This task has to be done according to the user's scanning settings and has to support the eventual overriding of the incoming traffic from higher priority groups or emergency calls.

In order to avoid the waste of bandwidth in the downlink for the transmission of traffic that will not be played out in the terminal, the filtering function obviously has to be implemented beforehand in the network, and this is one of the motivations for introducing the PoC Bridge 10 into the network architecture according to the preferred embodiment.

Figure 13:
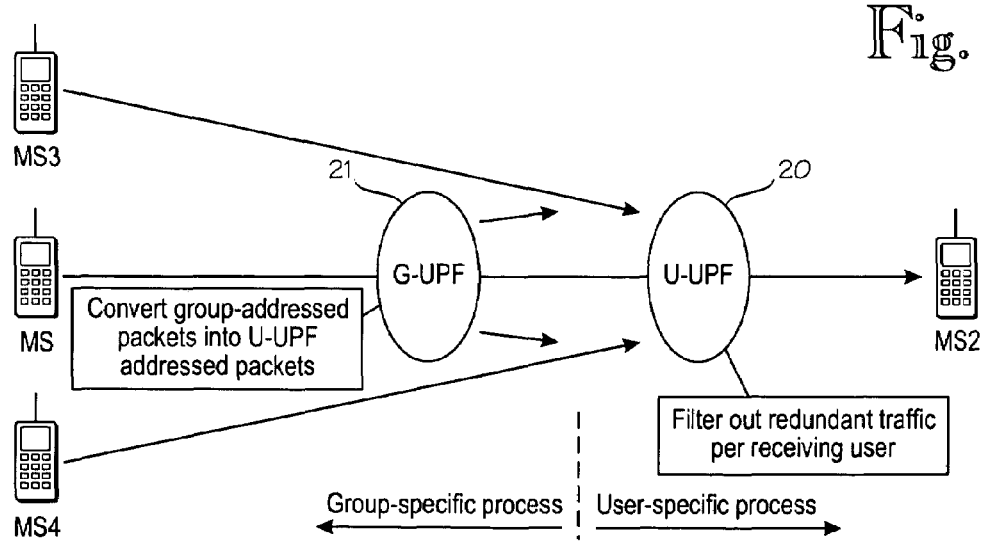
FIG. 13 is a block diagram illustrating the scanning filtering process.

The role of the bridge 10 in this context could be seen as two serial processes, namely group and user specific processes, as illustrated in FIG. 13. In the group specific process the G-UPF 21 has to multiply an incoming traffic in several packet streams which have to be forwarded to all the active members of the group or, in the preferred embodiment of the invention, to U-UPFs having active members in the groups to which these traffic streams are destined. In the user specific process, the U-UPF 20 has to decide which one of the several possible traffic streams addressed to a user actually needs to be forwarded to him. U-UPF also multiplies the stream for every user who receive the group traffic according to his current scanning settings (in the case the U-UPF serves more than one user). Sent traffic is normally the traffic from the currently listened group, but occasionally could be an overriding traffic stream.

In order to ensure conversation continuity (i.e. to ensure that a listener receives a coherent series of transmissions), a specific timer is provided in the U-UPF 20. The function of this timer is to keep the user receiving consecutive talkspurts in the same group (or individual call) unless there is a pause longer than a certain timeout in the conversation. Here we are talking about typical values between 2 and 15 seconds.

In principle this means that the scanning process shall lock to the received group after each packet, for the duration of this timer. Timer is located in U-UPF and timer values are preferably group specific. It is also advisable to use a different timeout for group and individual traffic. However, when higher priority traffic than the currently listened stream addressed to user arrives in U-UPF, higher priority stream overrides lower priority traffic immediately and the conversation continuity timer has no effect.

Figure 14:
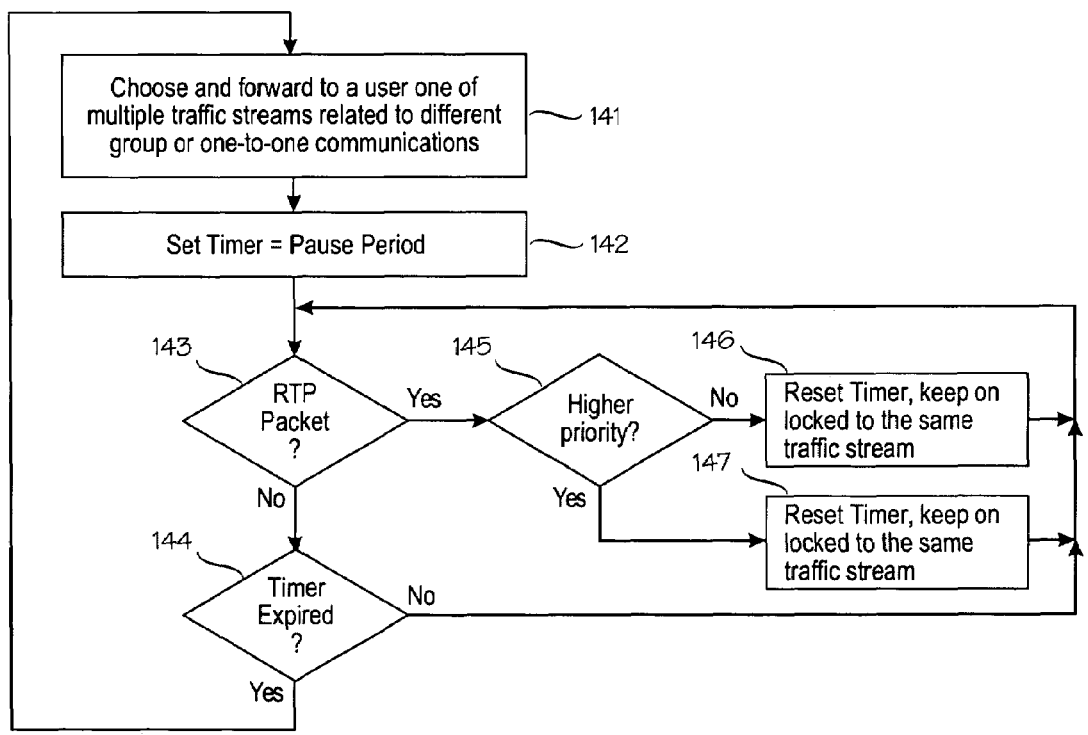
FIG. 14 illustrates an implementation of the scanning filtering process.

An example of the implementation of the scanning filtering process is illustrated in FIG. 14. In step 141, the process chooses one of multiple (i.e. two or more) voice packet traffic streams arriving to the U-UPF 20 from the G-UPF(s) 21 (group communications) or from another user or U-UPF (one-to-one communication), and forwards the chosen traffic stream to the user. Other arriving traffic streams are discarded, i.e. not forwarded to the user. When the choice is made, a timer is set to a predetermined value "Pause period", i.e. a maximum period of time between two consecutive voice packets in the chosen traffic stream (step 142). In step 143, the process checks whether a new RTP packet has been received. If a new RTP packet has arrived, it is first checked in step 145 whether that packet belongs to a higher priority stream than the previous packet. If this packet does not have higher priority than the previous one according to user's scanning settings, the process moves on to step 146 where the timer is reset and the packet is sent to the user. After that the process returns to step 143. If in step 145 it is noticed that the new packet belongs to a stream having higher priority than the previous one, the new packet is sent to the user and the timer is reset (step 147). After that the process returns to step 143. If no new packet is received, it is checked whether the timer has expired (step 144). If the timer has not expired, the process returns to step 143. If the timer has expired, the process deems the selected traffic stream to be interrupted, and returns to step 141 to select a new traffic stream.

One-to-one Call Management

Figure 15:
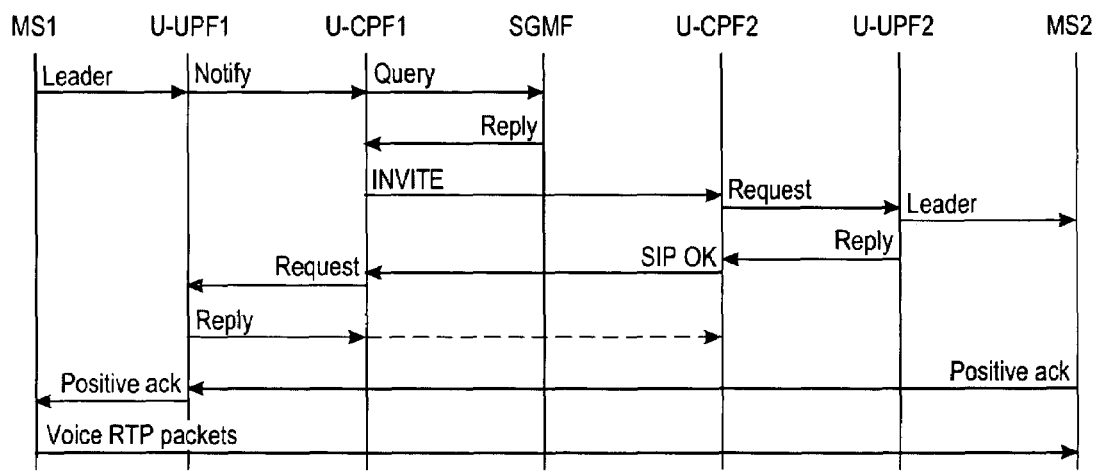
FIG. 15 is a signaling diagram illustrating signaling and communication relating to the setup of one-to-one communication.

An example of one-to-one call management is now described with reference to FIG. 15. A static port number is allocated into each U-UPF 20 for one-to-one traffic (such as the port 102 in FIG. 11).

If a user wants to establish a one-to-one communication, he pushes the PTT in his terminal MS1. The MS1 has just to send a leader packet containing his identity information (number or name) to his U-UPF1 using the specific "one-to-one" port number 102. This special leader packet is identified as such by the use of a specific RTP payload designated for this purpose. In addition to the identity of the called party (MS2), the leader packet may contain other relevant information.

Firstly, the caller's U-UPF1 assigns an SSRC value to be used by both participants in this one-to-one call. For reaching the called party and for performing the necessary rights checks, user's U-UPF1 is now contacted. It in turn contacts the SGMF for obtaining the called party's U-CPF2 address, for rights checking and for defining the correct form for caller's name representation. The information itself is contained in the PoC database or directory (PoC main information repository), from where SGMF gets the necessary information. The information is returned to caller's U-CPF1.

Now, U-CPF2 of the called party is contacted using SIP invite request. U-CPF2 of the called party sends a message to U-UPF2 of the called party, which in turn sends a leader packet to MS2 for checking its ability to receive one-to-one call. Also an acknowledgement is sent to U-CPF2 of the called party, which in turn returns a SIP OK message to U-CPF1 of the caller. U-CPF1 of the caller sends a message to U-UPF1 of the caller, and U-UPF1 acknowledges the message. Finally, SIP acknowledgement is returned to U-CPF2 of the called party and the network has successfully setup the call.

After a positive (embedded RTP signaling) acknowledgement is received from U-UPF of the called party, it is forwarded to MS1 which can now begin sending voice RTP packets.

At this stage the calling party is talking and the terminal MS1 sending RTP packets containing voice to his U-UPF 20, which based on the SSRC field in the packet will send the voice RTP packets to the called party's (MS2) U-UPF 20. Afterwards the called party's U-UPF will eventually deliver them (depending on the scanning process results) to the called party's terminal.

The called party ends the communication by releasing the PTT, in which case MS1 sends a trailer packet in order to indicate the stop of the communication to the U-UPF. It is also possible to employ a continuity monitoring as described with respect to FIG. 9.

Let us now consider examples of some special signaling cases which may occur in one-to-one communication.

The called party may simultaneously receive traffic in a group. Because of the limited bandwidth of the downlink, it is not advisable to forward multiple voice streams to the same mobile station MS (unless it is known that there is enough bandwidth to support reception of multiple streams). Therefore, in one-to-one traffic in the downlink is routed through the same scanning process in the called user's U-UPF 20, as applies to the group traffic. This ensures that each MS is only being sent one voice stream at a time.

Similarly, the same called party may receive more than one one-to-one call to the same called party at the same time. Therefore, the called party's U-UPF shall detect if there is a one-to-one voice transfer ongoing to an MS, and prevent any simultaneous one-to-one streams to the same MS. This is preferably handled with the same process that prevents multiple talkers in a group (the incoming traffic in the one-to-one port is filtered according to the recognized SSRCs).

Failing of the one-to-one call setup can depend on many different reasons, in which cases the caller's U-UPF receives a negative (embedded RTP signaling) acknowledgement from called party's U-UPF, which is forwarded to MS1. An example of this is that the the scanning process of MS2 is forwarding higher priority traffic. Another examples of this include that 1) the called party is unknown, 2) the called party is not currently logged on to the PoC service, 3) call rights check indicates that one-to-one calls between the parties are not allowed and 4) the called party is engaged in a circuit mode call. To ensure that the communicating parties experience a sense of mutual, two-way communication, U-UPF shall implement timer to ensure that a speech item that has been allowed to start (packets are being forwarded) is not interrupted by any traffic (except when overridden by higher priority traffic). Additionally, caller's U-UPF implements timers for ensuring that aa) conversation is not interrupted between short breaks (of the order of some seconds) between the speech items, b) speech item management is performed (either one of the participants has talkspurt state on) and c) maximum talkspurt time is observed (either one of the call participants is prevented from talking for too long. It must be noted that when timer a) goes off, the one-to-one call is cleared in PoC network.

Security

It is a requirement that the users should be able to rely, up to a reasonable level, on the identifications (group, talking party e.g.) provided by the system. The users should be able to rely, up to a reasonable level, that the contents of the received data have not been tampered with. The reasonable level corresponds to what is provided by public, circuit switched telephone networks.

Two principal approaches have been identified to satisfy this requirement: 1) relying on the security provided by the RAN and the security provided by the IP network between the RAN and the CPS 11 or the bridge 10; and 2) using the Security Architecture for IP (IPSec) authentication between the user equipment (the MS) and the CPS 11 or the bridge 10.

Relying on the security of both the underlying RAN and the IP network means specifically that 1) the CPS 11 and the bridge 10 check the identity of the transmitting user by looking at the source IP address; therefore the network prevents spoofing the source IP address; 2) an MS checks the identity of the transmitting CPS 11 or the bridge 10; therefore the network prevents spoofing the source IP address; 3) and the underlying network does not easily allow tampering with the contents of the packets.

The majority of users do not require extreme security. Usually a satisfactory level is achieved by air interface encryption in the RAN and preventing outside access to the traffic in the IP network. If necessary, the security of the IP network can be improved by using the IPSec between the network elements (this applies both to the IP network and to the PoC elements: the CPS 11 and the bridge 10).

As an option, the architecture according to the invention allows using the IPSec Authentication Headers (AH) between the MS and its U-UPF 20. Each MS (or the user, if needed) has a public-private key pair; likewise the U-UPF 20 has a public-private key pair. Standard IPSec mechanisms can then be used to set up a security association between the MS and its U-UPF 20.

This arrangement allows the authentication of an MS (or a user) which is logging on to the PoC service. After the log-on, the IPSec authentication headers must be used in all packets from the MS to the U-UPF 20. In this way the origin and integrity of the packets arriving at the proxy 20 (or CPS in case of control) can be verified. Similarly, authentication headers can be used in all packets from the proxy to the MS, which allows the MS to verify the origin and the integrity of the packets. In this manner, the security becomes a matter of trust between the MS and the proxy.

In other words, each MS subscribing to the PoC service has a two-way Security Association (SA) with its U-UPF 20. A complete working setup will require in addition: 1) A means to set up and manage the security associations (Internet Key Exchange, IKE); 2) A means to verify the public keys with a trusted source; and 3) A means to generate and distribute the public and private keys (Internet Security Association and Key Management Protocol, ISAKMP).

Even if this mechanism may look complicated, it uses standard and readily available solutions. If the IPSec authentication is taken into use later, it can be taken into use gradually by installing it in one U-UPF 20, which will be used to serve users with IPSec only. In other words, it is possible to support both authenticating and non-authenticating MSs and proxies.

Encryption

It is a requirement that specific users be able to use end-to-end encryption. As a simpler alternative, two-leg end-to-bridge-to-end encryption should be considered, because this greatly simplifies key management.

For users with higher encryption requirements than what is provided by air interface encryption of the underlying network, IPSec Encapsulating Security Payload (ESP) can be used to provide confidentiality (encryption) between the MS and the bridge. This, of course, requires that the IPSec is in use.

For instance, MS1 will encrypt the payload of the voice packets for sending to the proxy. The proxy will decrypt the packets, and then encrypt them again for forwarding to MS2. This provides almost the same level of security to the users as does end-to-end encryption, without any need for the communicating parties to share keys. Therefore, the usual key management problems associated with end-to-end encryption do not exist in this model.

In the proposed model, the PoC elements (CPS, Bridge) are the only security critical components in the network. Therefore, for users with very high security requirements, it might be feasible to install separate user proxies and bridges on secure premises under the control of the user group.

The description only illustrates preferred embodiments of the invention. The invention is not, however, limited to these examples, but it may vary within the scope and spirit of the appended claims.

The invention claimed is:

1. A method, comprising:
providing a group communication service entity on top of a communication system, providing said group communication service entity with individual addresses of group members in at least one group communication group, receiving voice packets from one of said group members to said group communication service entity, each voice packet being addressed to at least one said group communication group, wherein said voice packets are real time transport protocol packets, and forwarding said voice packets individually to each receiving group member on the basis of said individual addresses.

2. A method according to claim 1, wherein forwarding comprises forwarding said voice packets individually by user communication functions provided on top of said mobile communication system, and wherein said user communication functions are configured to manages user-specific voice packet streams between users.

3. A method, comprising:

providing a group communication service entity with individual addresses of group members of a group communication group, creating an individual logical connection from each group member to said group communication service entity by means of an outband signal, and starting a speech item in said group communication group in response to receiving a leader packet embedded in a user traffic stream from one of said group members to said group communication service entity over said individual logical connection, each leader packet comprising an identifier for said one group member, wherein said group communication service entity is configured to either reject said started speech item, or grant said started speech item to said one group member, and further configured to forward said leader packet and subsequent voice packets in said user traffic stream individually to each receiving group member in said group communication group on the basis of said individual addresses, wherein said voice packets are real time transport protocol packets.

4. A method according to claim 3, further comprising:

allocating an uplink bearer for said one group member in an air interface of said communication system prior to said one group member sending said leader packet and prior to granting of said speech item, and allocating a downlink bearer in an air interface for each receiving group member in response to receiving said leader packet forwarded by said group communication service entity and addressed to said respective group member, said leader packet being embedded in said user traffic stream.

5. A method, comprising:

granting a speech item to one group member of a group communication group, setting a first timer to measure a predetermined idle period in response to granting, resetting said first timer each time a voice packet is received from said one group member, wherein said voice packet is a real time transport protocol packet, and ending said granted speech item if said first timer expires indicating that said predetermined idle period has elapsed or from a last reception of said voice packet from said one group member.

6. A method according to claim 5, further comprising:

ending said granted speech item if a maximum allowed period of time has elapsed from granting.

7. A method according to claim 5, further comprising:

sending a trailer packet from said one group member, said trailer packet comprising a predetermined payload to indicate the end of sending, ending said speech item in response to receiving said trailer packet.

8. A method, comprising:

providing a user-specific communication function for managing traffic streams addressed to a user who is active in at least one group communication group or in a one-to-one communication, receiving a first voice packet stream related to a first group communication group or a first one-to-one communication and addressed to said user who is active in at least said first group communication group or said first one-to-one communication, forwarding said first voice packet stream to said user, monitoring continuity of said first voice packet stream, receiving at least one further voice packet stream related to at least one further group communication group or one further one-to-one communication, refraining transmission of one of said further voice packet streams to said user if said first voice packet data stream is continuous, and forwarding one of said further voice packet streams to said user if said first voice traffic stream has been discontinued for a predetermined period of time, wherein said first voice packet data stream and said at least one further voice packet data stream are real time transport protocol packet streams.

9. A method according to claim 8, wherein monitoring further comprises:

setting a timer to measure said predetermined period of time when a first packet of said first voice packet stream is forwarded to said user, resetting said timer each time a new packet of said first voice packet stream is forwarded to said user, and determining said first voice packet stream to be discontinued if said timer expires.

10. A method according to claim 8, further comprising:

interrupting said first voice packet stream immediately when a voice packet data stream comprising a higher priority is received.

11. A server system, comprising:

a group server provided on top of a communication system, wherein said group server comprises:

a data memory configured to store individual addresses of group members in at least one group communication group, a receiver configured to receive voice packets from said group members, each received voice packet comprising information identifying said group communication group to which a respective voice packet is addressed, wherein said voice packets are real time transport protocol packets, and a transmitter configured to forward each voice packet received from said group member comprising a speech item in a group communication group separately to each receiving group member in a respective group communication group on the basis of said individual addresses.

12. A server system according to claim 11, wherein said information identifying said group communication group identifies a port assigned to said group communication group in said group server.

13. A server system according to claim 11, further comprising:
   a call processing server provided on top of said communication system,
   wherein said call processing server is configured to control a plane management of said group communication group in said group server.

14. A server system according to claim 11, wherein said second server further comprises:
   a first timer responsive to said second server to start a measurement of a predetermined idle period,
   wherein said first timer is reset each time a voice packet comprising said granted speech item is received from said one group member, and
   wherein said second server is further configured to terminate said granted speech item if said first timer expires indicating that said predetermined idle period has elapsed or from a last reception of said voice packet from said one group member.

15. A server system according to claim 13, further comprising:
   a third server configured to establish an individual logical connection from each group member to said group server by means of an outband signal carried out between said call processing server and each group member.

16. A server system according to claim 11, wherein said first server is configured to receive a leader packet starting said speech item in said group communication group from one of said group members to said group server, said leader packet comprising an identifier of a respective group member and being embedded in a user traffic stream,
   wherein said group communication group is configured to either reject said started speech item, or grant said started speech item to said one group member, and further configured to forward said leader packet and subsequent voice packets in said user traffic stream individually to each receiving group member in said group communication group on the basis of said individual addresses.

17. A server system according to claim 11, further comprising:
   a group management server configured to provide a user interface for a remote creation and management of said group communication group in said server system.

18. A server system according to claim 17, wherein said user interface is based on one of the world wide web and wireless application protocol technologies.

19. A server system according to claim 11, wherein said group server is interconnected to said communication system by an internet protocol based network.

20. A server system according to claim 11, wherein said group server is configured to grant a speech item to one group member per a group communication group in turn.

21. A server system, comprising:
   a group server provided on top of a communication system, wherein said group server comprises:
      identification means for identifying and authenticating a source of a group communication group,
      control means for controlling that only one group member in said group communication group talks at a time,
      determination means for checking active group members in said group communication group to which voice packets from a currently talking group member are destined, wherein said voice packets are real time transport protocol packets,
      generation means for generating from an incoming voice packet an outgoing packet to be forwarded separately to each of said active group members, and
      selection means for selecting from possible multiple incoming traffic streams destined to said one group member one incoming traffic stream which is to be forwarded to said one group member.

22. A server system, comprising:
   at least one group communication network entity providing group specific communication functions, said group communication network entity comprising:
      storage means for storing individual addresses of group members in at least one group communication group,
      reception means for receiving voice packets from said group members, each received voice packet comprising information identifying said group communication group which a respective voice packet is addressed to, wherein said voice packets are real time transport protocol packets,
      grant means for granting a speech item to one group member per a group communication group in turn, and
      communication means for unicasting each voice packet received from said group member comprising said speech item in said group communication group separately to each receiving group member in a respective group communication group on the basis of said individual addresses, and
   at least one second user communication network entity providing user-specific communication functions for at least said one group member,
   wherein any group related communication from said one group member is first routed to said user communication network entity and then forwarded to an appropriate group network entity, and
   wherein any unicast voice packet from said group communication network entity is routed first to said user communication network entity prior to sending said voice packet to a respective user.

23. A server system according to claim 22, wherein said communication means for unicasting in said group communication network entity comprises:
   communication means for unicasting each voice packet received from said group member comprising a speech item in a group communication group separately to each user communication network entity serving at least one said group member, wherein each user communication network entity is configured to multiply said voice packet for each group member and to send said voice packet to said respective users.

24. A server system according to claim 22, wherein said information identifying said group communication group identifies a port assigned to said group communication group in said group server.

25. A server system, comprising:
   at least one group communication network entity providing group specific communication functions, said group communication network entity comprising:
      control means for controlling that only one group member in a group communication group talks at a time,
      determination means for checking active group members in said group communication group to which voice packets from a currently talking group member are destined, wherein said voice packets are real time transport protocol packets, and
      generation means for generating from an incoming voice packet an outgoing packet to be forwarded separately to a user server configured to serve at least one active member in said group communication group, and a user communication network entity providing user-specific communication functions on a user plane for at least user, said user communication network entity, comprising:

identification means for identifying and authenticating a source of said group communication group, and selection means for selecting from possible multiple incoming traffic streams destined to said group member one incoming traffic stream which is to be forwarded to said one group member.

26. A server system according to claim 25, said system further comprising:

a group call processing entity responsible for control plane management of said group communication group in said group communication network entity, and a user call processing entity responsible for control plane management of said group communication group in said user communication network entity.

27. A server system according to claim 25, wherein said control means for controlling said group communication group comprises:

first timer means for responding to a grant of a speech item for starting a measurement of a predetermined idle period from said granting, reset means for resetting said first timer each time a voice packet is received from said one group member comprising said granted speech item, and termination means for ending said granted speech item, if said first timer expires indicating that said predetermined idle period has elapsed, or from a last reception of said voice packet from said one group member.

28. A server system according to claim 25, wherein said system further comprises:

connection means for establishing an individual logical connection between each group member and said user communication network entity by means of an outband signal carried out between a user call processing entity and each group member.

29. A server system according to claim 25, further comprising:

grant means for granting a speech item to said one group member per said group communication group, said grant means for granting said speech item comprising:

request means for receiving a request for said speech item in said group communication group from said one group member to said group communication network entity in form of a leader packet embedded in a user traffic stream, said leader packet comprising an identifier of a respective group member, and evaluation means for either rejecting said request for a speech item, or granting said speech item to said one group member, and forwarding said leader packet and subsequent voice packets of said user traffic stream individually to each receiving group member.

30. A server system according to claim 25, said server system, further comprising:

a group management entity configured to provide a user interface for a creation and management of said group communication group in said server system.

31. A server system according to claim 30, wherein said user interface is based on one of the world wide web and wireless application protocol technologies.

32. A server system according to claim 25, wherein said group communication network entity is interconnected to said communication system by an internet protocol based network.

33. A server system, comprising:

at least one group communication network entity providing group specific communication functions in a user plane, said group communication network entity, comprising:

storage means for storing individual addresses of group members in at least one group communication group, reception means for receiving voice packets from said group members, each received voice packet comprising information identifying said group communication group which a respective packet is addressed to, wherein said voice packets are real time transport protocol packets, grant means for granting a speech item to one group member per communication group in turn, and communication means for unicasting each voice packet received from said group member comprising said speech item in a group communication group separately to each receiving group member in said respective group communication group on the basis of said individual addresses, a user communication network entity providing user-specific communications functions on a user plane for at least one group member, wherein any group related communication from said one group member is first routed to said user communication network entity and then forwarded to an appropriate group communication network entity, and wherein any unicast voice packet from said group communication network entity is routed first to said user communication network entity prior to sending said voice packet to a respective user, a group call processing entity responsible for control plane management of said group communication group in said group communication network entity, and a user call processing entity responsible for control plane management of said group communication group in said user communication network entity.

34. A network unit, comprising:

storage means for storing individual addresses of group members in at least one group communication group, reception means for receiving voice packets from said group members, each received voice packet comprising information identifying said group communication group which a respective packet is addressed to, wherein said voice packets are real time transport protocol packets, grant means for granting a speech item to one group member per said group communication group in turn, communication means for unicasting each voice packet received from said group member comprising said speech item in said group communication group separately to each receiving member in a respective group communication group on the basis of said individual addresses.

35. A network unit according to claim 34, wherein reception means for receiving voice packets from said group members via a user communication entity providing user-specific services for that group member, and communications means for unicasting voice packets separately to each receiving group member via said user communication entity providing user-specific services for that group member.

36. A network unit according to claim 34, further comprising:
  first timer means for responding to said grant means for starting a measurement of a predetermined idle period from granting,
  reset means for resetting said first timer each time said voice packet is received from one of said group members,
  termination means for ending said granted speech item, if said first timer expires indicating that said predetermined idle period has elapsed, or from a last reception of said voice packet from said one group member.

37. A network unit according to claim 34, wherein said network unit is on top of said communication system.

38. A network unit according to claim 34, wherein said network unit is connected to said communication system by an internet protocol based network.

39. A network unit, comprising:
  selection means for selecting for unicast to a user a first voice packet data stream related to a first group communication group or said one-to-one communication addressed to said user,
  monitor means for monitoring a continuity of said selected first voice packet data stream, and
  communication means for discarding any other received voice packet data stream related to at least one further group communication group or said one-to-one communication, if said currently selected voice packet stream is continuous, and means for selecting and unicasting another received voice packet stream to said user if said initially selected and unicasted first voice packet data stream has been discontinued for a predetermined period of time,
  wherein said voice packet data streams are real time transport protocol packet streams.

40. A network unit according to claim 39, wherein said monitor means comprises:
  a timer configured to measure said predetermined period of time when a first packet of said selected voice packet data stream is forwarded to said user,
  reset means for resetting said timer each time a new packet of said selected voice packet data stream is forwarded to said user, and
  determination means for determining said selected voice packet data stream to be discontinued if said timer expires.

41. A network unit according to claim 40, wherein a transmission of said first voice packet data stream is immediately interrupted when a voice packet data stream comprising higher priority is received.

42. A method, comprising:
  providing a communication server on top of the a communication system,
  creating an individual logical connection between said communication server and each user comprising an active communication service in said communication server,
  starting a communication in respnse to receiving a leader packet embedded in a traffic stream from a user to said communication server over a respective said individual logical connection, each leader packet comprising an identifier of said sending user and a receiving user,
  wherein said communication server is configured to either reject a started speech item, or grant said ii) started speech item to said sending user, and
  forwarding said leader packet and subsequent voice packets of said traffic stream to said receiving user on the basis of said received identifier of said receiving user,
  wherein said voice packets are real time transport protocol packets.

43. A method according to claim 42, wherein forwarding further comprises:
  acquiring an internet protocol address of said receiving user from a communication control server on the basis of a received identity of said receiving user,
  forwarding said leader packet and subsequent voice packets to said internet protocol address of said receiving user.

44. A method according to claim 42, wherein said sending user sends said leader packet and subsequent voice packets to a specific port assigned for one-to-one voice communication in said communication server.

45. A subscriber equipment, comprising:
  mechanisms for packet data communication over a communication system, and
  a group communication application on top of said mechanisms,
  wherein said group communication application comprises connection means for establishing a logical packet connection to a group communication server, and transmission means for sending and for receiving voice packets to and from said group communication server, wherein said voice packets are real time transport protocol packets.

46. A subscriber equipment according to claim 45, wherein said group communication application is a voice over internet protocol application.

47. A subscriber equipment according to claim 46, further comprising:
  a push-to-talk mechanism,
  communication means for, reactive to activation of said push-to-talk mechanism by a user, sending a leader packet followed by voice packets in a user traffic stream to said group communication server over said logical packet connection to start a speech item.

48. A subscriber equipment, comprising:
  a push-to-talk mechanism,
  communications means, responsive to activation of said push-to-talk mechanism by a user, for sending a leader packet followed by voice packets in a user traffic stream to group communication server to a speech item, wherein said voice packets are real time transport protocol packets.

49. A subscriber equipment according to claim 45, further comprising
  termination means, responsive to receiving an indication that a speech item is not granted to a user from said group communication service after sending a leader packet, for terminating transmission of further voice packets and said speech item although a push-to-talk mechanism is still activated.

50. A subscriber equipment according to claim 45, further comprising:
  termination means, reactive to deactivation of a push-to-talk mechanism by the user, for terminating transmission of said speech item and further voice packets.

51. A subscriber equipment according to claim 45, further comprising:
  transmission means, reactive to deactivation of a push-to-talk mechanism by a user, for sending a trailer packet embedded in a user traffic stream to said group communication service to stop a speech item.

52. A subscriber equipment according to claim 49, wherein said indication is said reception of said voice packet or said leader packet originating from another user in a group communication group after sending said leader packet.

53. A subscriber equipment according to claim 49, wherein said indication is said reception of said voice packet comprising a predetermined payload type after sending said leader packet.

54. A subscriber equipment according to claim 49, further comprising:
alert means, responsive to said reception of said indication, for alerting said user that said speech item was not granted.

55. A subscriber equipment according to any claim 45, further comprising:
indication means for giving an audible indication to a user to start speaking after the activation of a push-to-talk mechanism.

56. A subscriber equipment according to claim 55, wherein said indication means comprises a timer configured to enable said audible indication after a predetermined period of time has expired from said activation of said push-to-talk mechanism.

57. A subscriber equipment according to claim 55, wherein said indication means gives said audible indication after one of an uplink bearer has been allocated, said leader packet has been sent, said group communication service has processed said leader packet and granted a speech item, and a receiving party has acknowledged said leader packet.

58. A method, comprising:
storing individual addresses of group members in at least one group communication group,
managing said group communication group using a control plane signaling,
requesting group member speech item requests using a user-plane signaling embedded in a user traffic stream,
granting a speech item to one group member per a group communication group in turn based on said embedded user plane signaling,
receiving voice packets from a group member comprising a speech item in a group communication group, each received voice packet comprising information identifying said group communication group which a respective packet is addressed to, wherein said voice rackets are real time transport protocol packets, and
unicasting said embedded user-plane signaling and each voice packet received from said group member comprising a speech item separately to each receiving member in said respective group communication group on the basis of said individual addresses.

59. A system, comprising:
storage means for storing individual addresses of group members in at least one group communication group,
management means for managing said group communication group using a control plane signaling,
grant means for granting a speech item to one group member per said communication group in turn based on a speech item requests speech sent by said group members using user-plane signaling embedded in a user traffic stream,
reception means for receiving voice packets from said group member comprising said speech item in a group communication group, each received voice packet comprising information identifying said group communication group which a respective packet is addressed to, wherein said voice packets are real time transport protocol packets, and communication means for unicasting said embedded user-plane signaling and each voice packet received from said group member comprising said speech item separately to each receiving member in said respective group communication group on the basis of said individual addresses.

60. A system according to claim 59, wherein said embedded speech item signaling comprises a leader packet sent in a beginning of said user traffic stream comprising user voice data packets, and wherein said system grants or rejects said speech item based on said leader packet.

61. A system according to claim 60, wherein said system, upon granting said speech item to a group communication service based on said leader packet, opens a speech item communication to receiving members of said group communication group by forwarding said user traffic stream comprising said leader packet and subsequent voice packets to said receiving members.

62. A system according to claim 59, wherein said embedded speech item signaling comprises a trailer packet sent at an end of said user traffic stream comprising user voice data packets, and wherein said system ends said speech item based on said trailer packet.

63. A system according to claim 59, wherein said system forwards a trailer packet at an end of said user traffic stream to receiving group members in order to end said speech item communication to said receiving group members.

64. A subscriber equipment, comprising:
mechanisms for packet data communication over a communication system, and
a group communication application on top of said mechanisms,
wherein said group communication application comprises connection means for establishing a logical packet connection to a group communication service by means of a control plane signaling, communication means for sending and receiving voice packets to and from said group communications server, and request means for requesting a speech item by means of a user plane signaling, and wherein said voice packets are real time transport protocol packets.

65. A subscriber equipment according to claim 64, wherein said speech item signaling comprises a leader packet sent in a beginning of a user traffic stream comprising user voice data packets.

66. A subscriber equipment according to claim 64, wherein said speech item signaling comprises a trailer packet sent at an end of a user traffic stream comprising user voice data packets RTP.

67. A method, comprising
configuring subscriber equipment for packet data communication over a mobile communications system comprising a packet mode group voice communication service,
providing said subscriber equipment with a group communication application layered on top of said packet data communication,
establishing by said group communication application a logical packet connection to a group communication server, and
sending and receiving by said group communication application voice packets to and from said group communications server, each voice packet being addressed to at least one said group communication group, wherein said voice packets are real time transport protocol packets.

68. A network unit, comprising:

a data memory configured to store individual addresses of group members in at least one group communication group, a receiver configured to receive voice packets from said group members, each received voice packet comprising information identifying said group communication group to which a respective voice packet is addressed, wherein said voice packets are real time transport protocol packets, and a transmitter configured to forward each voice packet received from said group member comprising a speech item in said group communication group separately to each receiving group member in a respective group communication group on the basis of said individual addresses.

* * * * *